United States Patent
Wakamatsu

(10) Patent No.: US 9,883,104 B2
(45) Date of Patent: Jan. 30, 2018

(54) CONTROL APPARATUS, IMAGE PICKUP APPARATUS, CONTROL METHOD, AND NON-TRANSITORY COMPUTER-READABLE STORAGE MEDIUM WHICH ARE CAPABLE OF PERFORMING TILT CORRECTION

(71) Applicant: CANON KABUSHIKI KAISHA, Tokyo (JP)

(72) Inventor: Nobushige Wakamatsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/049,378

(22) Filed: Feb. 22, 2016

(65) Prior Publication Data

US 2016/0255273 A1 Sep. 1, 2016

(30) Foreign Application Priority Data

Feb. 26, 2015 (JP) .................................. 2015-036324

(51) Int. Cl.
*H04N 5/232* (2006.01)

(52) U.S. Cl.
CPC ..... *H04N 5/23248* (2013.01); *H04N 5/23258* (2013.01); *H04N 5/23287* (2013.01)

(58) Field of Classification Search
CPC ............. H04N 5/23248; H04N 5/2328; H04N 5/23258
See application file for complete search history.

(56) References Cited

U.S. PATENT DOCUMENTS

| | | | | |
|---|---|---|---|---|
| 5,794,078 A * | 8/1998 | Okazaki | .................. | G03B 5/00 396/50 |
| 6,636,826 B1 * | 10/2003 | Abe | ...................... | G01C 19/56 702/151 |
| 2008/0136923 A1 * | 6/2008 | Inbar | .................... | G02B 27/646 348/208.2 |
| 2009/0019933 A1 * | 1/2009 | Sung | ..................... | G01C 19/56 73/504.04 |
| 2012/0033093 A1 * | 2/2012 | Ku | ........................ | H04N 5/2328 348/208.2 |
| 2014/0036101 A1 * | 2/2014 | Imanishi | ............ | H04N 5/23258 348/208.5 |
| 2014/0270743 A1 * | 9/2014 | Webb | ................... | H04N 5/2328 396/55 |
| 2014/0327789 A1 * | 11/2014 | Tsuchiya | ............ | H04N 5/23258 348/208.11 |

(Continued)

FOREIGN PATENT DOCUMENTS

| | | |
|---|---|---|
| JP | 07-095466 A | 4/1995 |
| JP | 2013-003169 A | 1/2013 |

(Continued)

*Primary Examiner* — Timothy J Henn
(74) *Attorney, Agent, or Firm* — Cowan, Liebowitz & Latman, P.C.

(57) ABSTRACT

A control apparatus includes a first angle calculating unit configured to calculate a first angle based on an acceleration detected by an acceleration detector, an analyzing unit configured to analyze a vibration state based on at least one of the acceleration and an angular velocity detected by an angular velocity detector, a second angle calculating unit configured to calculate a second angle based on the angular velocity, the first angle, and the vibration state, and a correcting unit configured to perform tilt correction based on the second angle.

44 Claims, 11 Drawing Sheets

(56) References Cited

U.S. PATENT DOCUMENTS

| | | | | |
|---|---|---|---|---|
| 2015/0036007 A1* | 2/2015 | Wakamatsu | ........ | H04N 5/23267 |
| | | | | 348/208.2 |
| 2015/0036011 A1* | 2/2015 | Wakamatsu | ......... | H04N 5/2328 |
| | | | | 348/208.7 |
| 2016/0065853 A1* | 3/2016 | Kang | ................. | H04N 5/23258 |
| | | | | 348/345 |

FOREIGN PATENT DOCUMENTS

| | | |
|---|---|---|
| JP | 2013-130836 A | 7/2013 |
| JP | 2014-056057 A | 3/2014 |
| JP | 2014-066995 A | 4/2014 |
| JP | 2014-160226 A | 9/2014 |

* cited by examiner

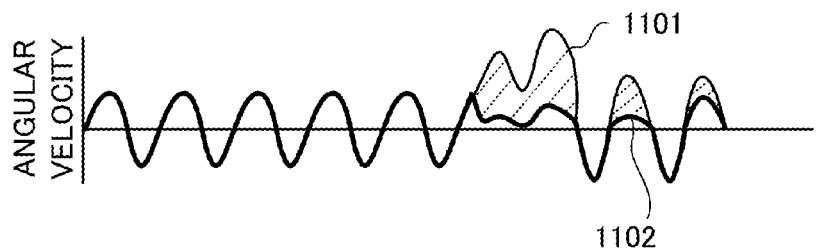
FIG. 11A
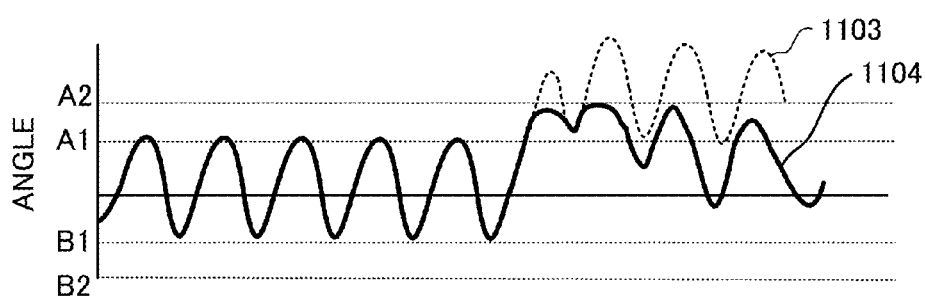
FIG. 11B
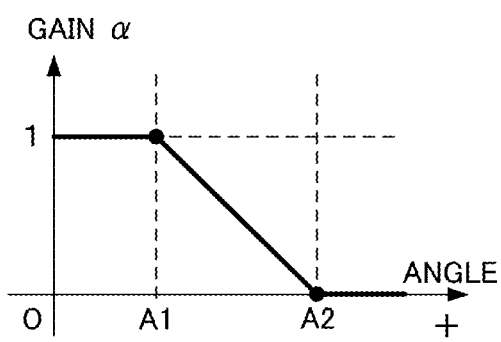 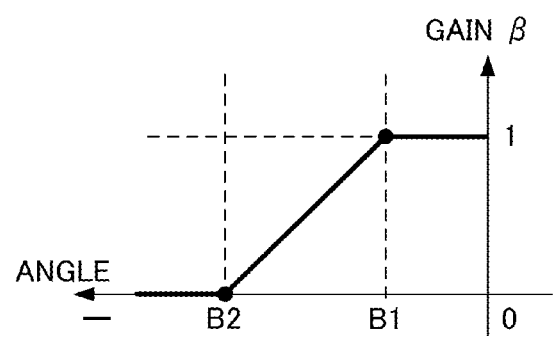
FIG. 11C          FIG. 11D

CONTROL APPARATUS, IMAGE PICKUP APPARATUS, CONTROL METHOD, AND NON-TRANSITORY COMPUTER-READABLE STORAGE MEDIUM WHICH ARE CAPABLE OF PERFORMING TILT CORRECTION

BACKGROUND OF THE INVENTION

Field of the Invention

The present invention relates to an image pickup apparatus which is capable of performing highly-accurate tilt correction.

Description of the Related Art

Previously, an image pickup apparatus which is capable of detecting a tilt angle of the image pickup apparatus by using an accelerometer or the like and automatically correcting tilt of the image pickup apparatus to capture a horizontal image that is perpendicular to a gravity direction of the image pickup apparatus for a user who is inexperienced in capturing images has been proposed. Japanese Patent Laid-open No. H7-95466 discloses an image pickup apparatus which detects a tilt of the image pickup apparatus and performs tilt correction to correct the tilt around an optical axis with respect to a horizontal plane of an image pickup element that is perpendicular to the gravity direction.

In a tilt correction apparatus which performs the tilt correction as disclosed in Japanese Patent Laid-open No. H7-95466, it is possible to perform highly-accurate tilt correction if the influence of a gravity acceleration is dominant in an output signal from the accelerometer with a small hand shake. However, if the handshake is large, the acceleration generated by the shake is added to the gravity acceleration to be output from the accelerometer. Accordingly, when the tilt correction is performed by using the output signal of the accelerometer while the acceleration caused by the shake is added to the gravity acceleration, the correction is performed so as to be a tilt which is different from a target tilt, and accordingly an image which is not intended by a user is obtained.

SUMMARY OF THE INVENTION

The present invention provides a control apparatus, an image pickup apparatus, a control method, and a non-transitory computer-readable storage medium which are capable of performing highly-accurate tilt correction even in a large vibration state.

A control apparatus as one aspect of the present invention includes a first angle calculating unit configured to calculate a first angle based on an acceleration detected by an acceleration detector, an analyzing unit configured to analyze a vibration state based on at least one of the acceleration and an angular velocity detected by an angular velocity detector, a second angle calculating unit configured to calculate a second angle based on the angular velocity, the first angle, and the vibration state, and a correcting unit configured to perform tilt correction based on the second angle.

An image pickup apparatus as another aspect of the present invention includes an image pickup element configured to photoelectrically convert an optical image formed via an optical system to output an image signal, an acceleration detector configured to detect an acceleration, an angular velocity detector configured to detect an angular velocity, a first angle calculating unit configured to calculate a first angle based on the acceleration, an analyzing unit configured to analyze a vibration state based on at least one of the acceleration and the angular velocity, a second angle calculating unit configured to calculate a second angle based on the angular velocity, the first angle, and the vibration state, and a correcting unit configured to perform tilt correction based on the second angle.

A control method as another aspect of the present invention includes the steps of calculating a first angle based on an acceleration detected by an acceleration detector, analyzing a vibration state based on at least one of the acceleration and an angular velocity detected by an angular velocity detector, calculating a second angle based on the angular velocity, the first angle, and the vibration state, and performing tilt correction based on the second angle.

A non-transitory computer-readable storage medium as another aspect of the present invention stores a program causing a computer to execute a process including the steps of calculating a first angle based on an acceleration detected by an acceleration detector, analyzing a vibration state based on at least one of the acceleration and an angular velocity detected by an angular velocity detector, calculating a second angle based on the angular velocity, the first angle, and the vibration state, and performing tilt correction based on the second angle.

Further features and aspects of the present invention will become apparent from the following description of exemplary embodiments with reference to the attached drawings.

BRIEF DESCRIPTION OF THE DRAWINGS

FIGS. 11A to 11D are explanatory diagrams of control of limiting a movable range of the image pickup apparatus in Embodiment 2.

DESCRIPTION OF THE EMBODIMENTS

Exemplary embodiments of the present invention will be described below with reference to the accompanied drawings.

[Embodiment 1]

Figure 1:
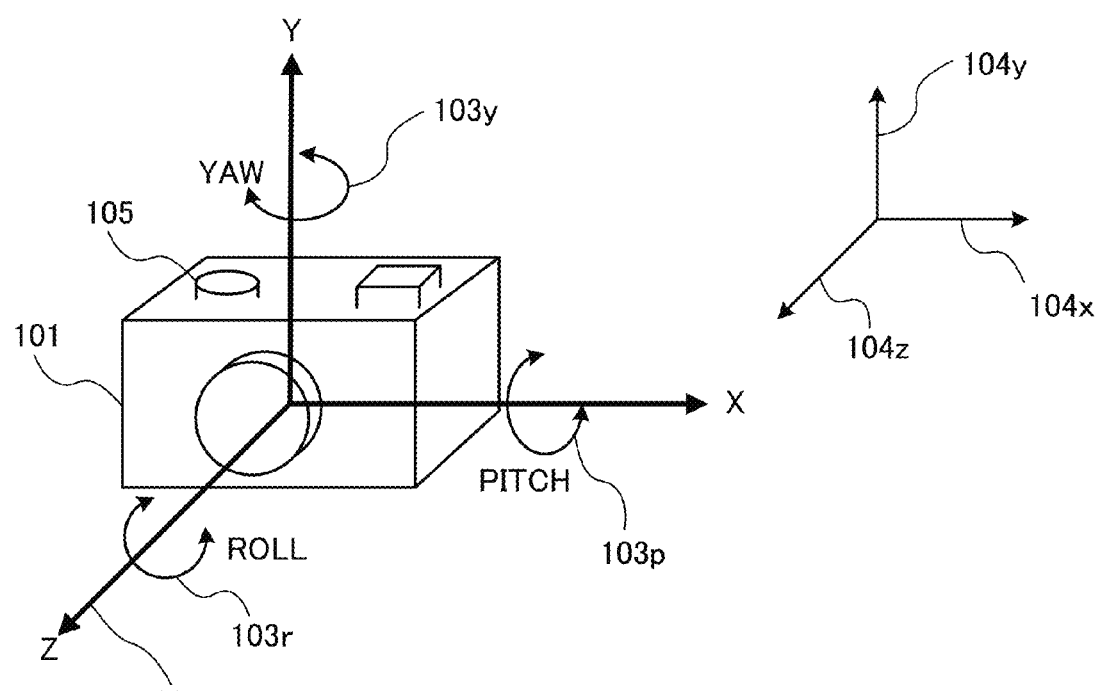
FIG. 1 is an explanatory diagram of a vibration direction of an image pickup apparatus in each embodiment.

First of all, a vibration direction of an image pickup apparatus 101 (camera) in Embodiment 1 of the present invention will be described. FIG. 1 is an explanatory diagram of the vibration direction of the image pickup apparatus 101. The image pickup apparatus 101 (tilt correction apparatus) in this embodiment has a tilt correction function, and it is capable of correcting the tilt in a pitch direction (pitch angle, or tilt angle), a yaw direction (yaw angle, or tilt angle), and roll direction (roll angle, or horizontal angle) indicated as arrows 103p, 103y, and 103r, respectively, with respect to an optical axis 102. The image pickup apparatus 101 includes an angular velocity detector (angular velocity meter 214) and an acceleration detector (accelerometer 213). The angular velocity meter 214 detects an angular velocity for each of the arrows 103p, 103y, and 103r (around each of a pitch axis, a yaw axis, and a roll axis). The accelerometer 213 detects an acceleration in each of x axis, y axis, and z axis directions indicated as arrows 104x, 104y, and 104z, respectively.

Figure 2:
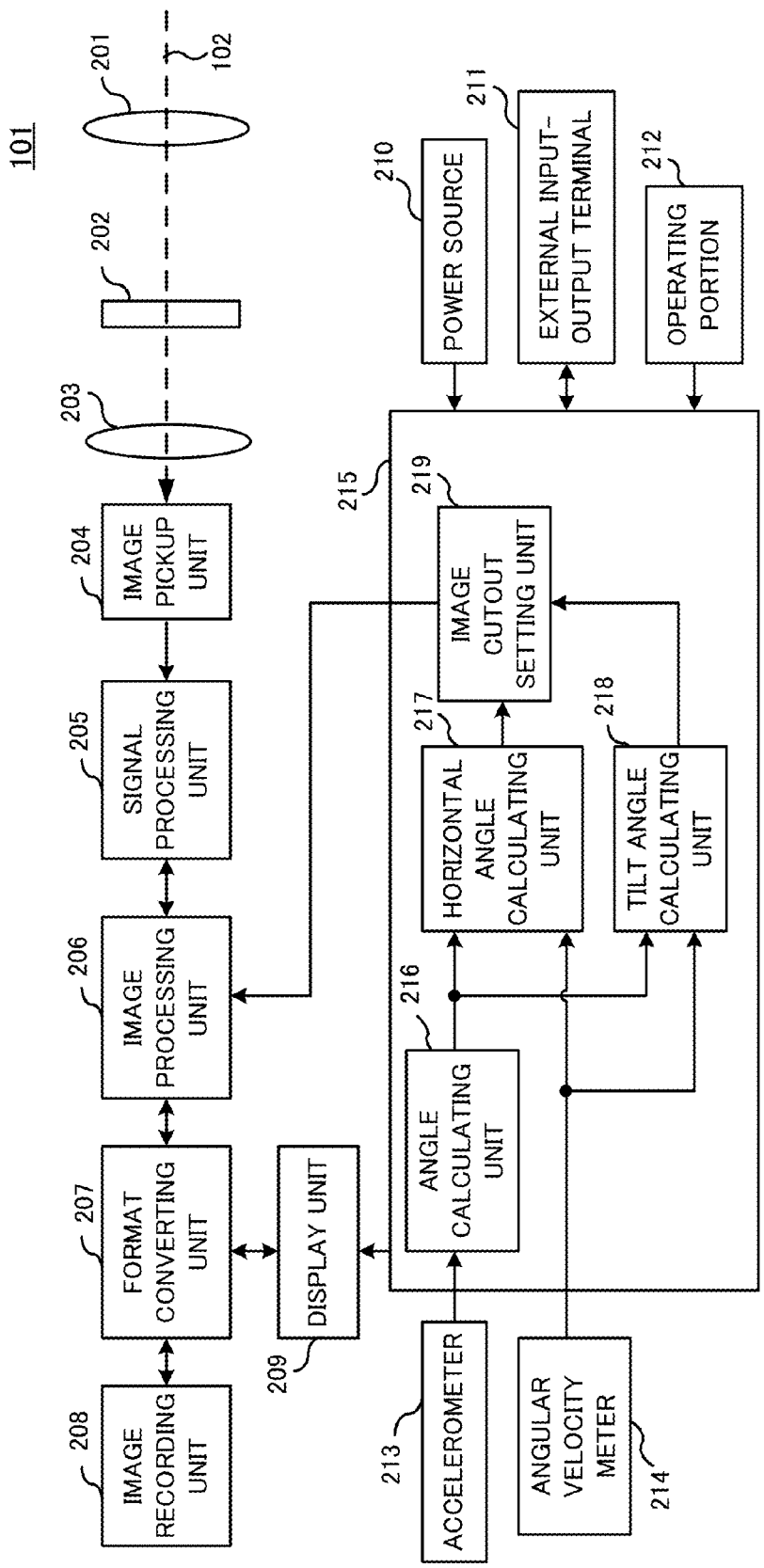
FIG. 2 is a block diagram of the image pickup apparatus in Embodiment 1.

Next, referring to FIG. 2, a configuration of the image pickup apparatus 101 will be described. FIG. 2 is a block diagram of the image pickup apparatus 101. In FIG. 2, a zoom unit 201 includes a zoom lens that varies magnification (i.e., performs zooming) and a zoom position detector that detects a zoom position. A stop/shutter unit 202 drives a stop/shutter. A focus unit 203 includes a lens which performs focusing. The zoom unit 201, the stop/shutter unit 202, and the focus unit 203 constitute an optical system (image pickup optical system). An image pickup unit 204 (image pickup device) includes an image pickup element (image sensor) such as a CCD and a CMOS, and it receives light incident via each lens unit constituting the optical system to output information of charges, as analog image data, depending on a light amount to a signal processing unit 205 (signal processor). In other words, the image pickup unit 204 photoelectrically converts an optical image (object image) formed via the optical system to output an image signal (image data).

The signal processing unit 205 converts an electric signal (analog image data) output from the image pickup unit 204 into digital image data. The image processing unit 206 (image processor) performs processing, such as distortion correction, white balance adjustment, and color interpolation processing, on the digital image data output from the signal processing unit 205 in accordance with the purpose of use.

A display unit 209 (display device) is for example a small-sized liquid crystal display apparatus (LCD), and it displays the digital image data output from the image processing unit 206. A format converting unit 207 (format converter) converts the digital image data output from the image processing unit 206 into a recording format such as JPEG to be output to an image recording unit 208 (image recorder). The image recording unit 208 records the digital image data converted by the format converting unit 207 in a recording medium such as a non-volatile memory.

The accelerometer 213 (triaxial accelerometer) detects and outputs an acceleration with respect to each of the x axis, y axis, and z axis indicated as the arrows 104x, 104y, and 104z in FIG. 1, respectively. The angular velocity meter 214 (triaxial angular velocity meter) detects and outputs an angular velocity around the pitch axis, the yaw axis, and the roll axis indicated as the arrows 103p, 103y, and 103r in FIG. 1, respectively. A power source 210 supplies power to each portion in the image pickup apparatus 101 in accordance with the purpose of use. An external input-output terminal 211 inputs and outputs a communication signal or an image signal (image data) which is received from or sent to an external apparatus. An operating portion 212 is a member to operate the image pickup apparatus 101. A controller 215 (control apparatus) controls an entire system of the image pickup apparatus 101. The controller 215 includes an angle calculating unit 216 (first angle calculating unit), a horizontal angle calculating unit 217 (second angle calculating unit), a tilt angle calculating unit 218 (second angle calculating unit), and an image cutout setting unit 219 (image clipping unit, or setting unit).

Figure 3:
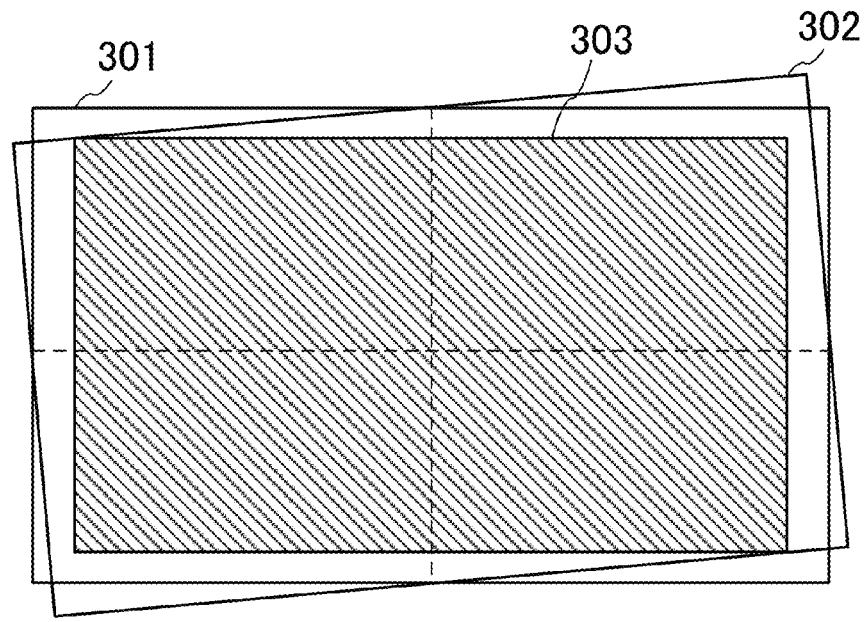
FIG. 3 is an explanatory diagram of an image cutout processing in Embodiment 1.

Next, referring to FIG. 3, electronic image stabilizing control in which a part of an image is cut out for each frame according to a correction amount to correct the image will be described. FIG. 3 is an explanatory diagram of image cutout processing in this embodiment, and it illustrates an image which has been corrected by the electronic image stabilizing control performed by the controller 215 (image cutout setting unit 219) and the image processing unit 206. In this embodiment, the image cutout setting unit 219 calculates a correction amount (tilt correction amount) to perform a rotation correction so that the cutout image maintains a horizontal direction that is perpendicular to a gravity direction based on a calculation result of an angle in the roll direction of the image pickup apparatus 101.

In FIG. 3, reference numeral 301 denotes a captured image which is input to the image processing unit 206. Reference numeral 302 denotes a rotated image which is obtained by performing rotation processing based on the tilt correction amount. Reference numeral 303 denotes an output image which is obtained by cutting out an inscribed portion having the same aspect as that of the captured image 301 based on the rotated image 302 by performing the electronic image stabilizing correction. The controller 215 performs the cutout processing of the output image 303 for each frame of a moving image, and accordingly it can perform the tilt correction in the horizontal direction by the electronic image stabilizing correction. When performing rotation correction in the tilt direction, the controller 215 calculates an image shift amount that is to be used to correct the tilt angle based on a calculation result of the tilt angle and focal length information depending on zoom position information to perform the image cutout processing in accordance with the image shift amount. The controller 215 performs the cutout processing for each frame of the moving image and accordingly it can perform the tilt correction in the tilt direction by the electronic image stabilizing correction.

Next, the tilt correction control that is performed by the controller 215 will be described. When an instruction to turn on a tilt correction function is given via the operating portion 212, the controller 215 instructs a start of tilt correction processing. The tilt correction processing continues until an instruction to turn off the tilt correction function is given via the operating portion 212. The controller 215 calculates a tilt angle (i.e., a pitch angle and a yaw angle as a tilt angle, and a roll angle as a horizontal angle) of the image pickup apparatus 101 based on an output signal of the accelerometer 213 and an output signal of the angular velocity meter 214. Then, the image processing unit 206 performs the image cutout based on a correction amount (tilt correction amount) set by the controller 215 (image cutout setting unit 219) to perform the tilt correction.

The output signal of the accelerometer 213 is input to the angle calculating unit 216 of the controller 215. The angle calculating unit 216 calculates the tilt angle of the image pickup apparatus 101 based on the output signal of the accelerometer 213. In the accelerometer 213, an acceleration sensor is disposed so that an X axis of its measurement axis faces a horizontal direction of the image pickup element, a Y axis of the measurement axis faces a vertical direction of the image pickup element, and an optical axis direction of the image pickup apparatus 101 faces a Z axis. The angle calculating unit 216 calculates the tilt angle (absolute angle as a pitch angle, a yaw angle, and a roll angle) of the image pickup apparatus 101 in the pitch direction, the yaw direction, and the roll direction indicated as the arrows 103p, 103y, and 103r, respectively, based on the relation of the output signals of the accelerations for the respective axes.

The image processing unit 206 is capable of performing the tilt correction based on the absolute angle of the image pickup apparatus 101 calculated by the angle calculating unit 216. The tilt angle can be calculated accurately only when the acceleration is not influenced from the outside while the image pickup apparatus 101 is in a still state, i.e., a gravity acceleration is dominant with respect to the acceleration detected by the accelerometer 213. For example, when a user captures an image while walking with the image pickup apparatus 101 held by hand, the user captures an image while fixing and attaching the image pickup apparatus 101 to apart of a body of the user, or the user captures an image while attaching the image pickup apparatus 101 to a machine such as a vehicle and a motorcycle, an influence of an acceleration (vibration acceleration) other than the gravity acceleration is large. When an image is captured on condition that a shake (vibration) is large, the influence of the vibration acceleration cannot be ignored and accordingly an image blur may be worsened conversely due to erroneous calculation of the tilt angle.

On the other hand, there may be a method of detecting the tilt angle by using the angular velocity meter 214. However, a gyro sensor that is mainly used in the angular velocity meter 214 has a large output offset variation due to a low frequency noise or a temperature change. Accordingly, it is difficult to perform integration processing by using the output signal of the angular velocity meter 214 as it is to perform the angle calculation. When the angular velocity meter 214 is used in a vibration correction apparatus, the tilt correction cannot be performed because a low frequency component is cut while the low frequency noise is cut by a HPF to perform vibration correction in which an angle shake of a high frequency component is corrected.

Figure 4:
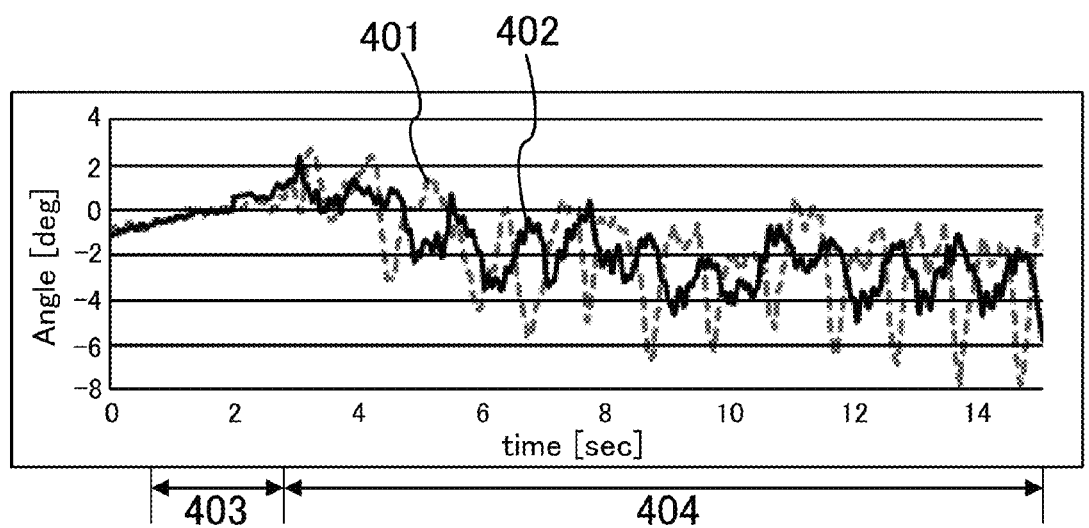
FIG. 4 is an explanatory diagram of an angle waveform of the image pickup apparatus in Embodiment 1.

FIG. 4 is an explanatory diagram of angle waveforms (angle signals) of the image pickup apparatus 101, and it illustrates time-series data of an actual roll angle of the image pickup apparatus 101 and a roll angle calculated by the angle calculating unit 216 based on the output signal of the accelerometer 213 in a certain vibration state. In FIG. 4, a waveform 401 (dashed line) indicates the roll angle calculated by the angle calculating unit 216, and a waveform 402 (solid line) indicates the actual roll angle of the image pickup apparatus 101. A time period 403 indicates s state in which the vibration of the image pickup apparatus 101 is small, that is, for example a state in which a user holds the image pickup apparatus 101 firmly so that a hand shake does not occur. A time period 404 indicates a state in which the vibration of the image pickup apparatus 101 is large, that is, for example the user captures an image while walking.

During the time period 403, a difference between the waveform 401 and the waveform 402 is not large (both waveforms are similar to each other), and accordingly the angle calculating unit 216 can calculate the absolute angle of the image pickup apparatus 101 relatively accurately. On the other hand, during the time period 404, the difference between the waveform 401 and the waveform 402 is large (both waveforms are extremely different from each other), and accordingly it is difficult to calculate the absolute angle of the image pickup apparatus 101 accurately. In other words, with respect to the state in which the vibration is relatively small (time period 403), the gravity acceleration is dominant for the output signal of the accelerometer 213 and accordingly it is possible to calculate the angle accurately. On the other hand, with respect to the state in which the vibration is large (time period 404), the output signal of the accelerometer 213 contains a vibration acceleration in addition to the gravity acceleration, and accordingly there is a high possibility that the angle is erroneously calculated. In this embodiment, the controller 215 calculates the absolute angle for the tilt correction based on an angle which is calculated based on an acceleration containing a vibration noise detected by the accelerometer 213 and an angular velocity containing a low frequency noise detected by the angular velocity meter 214.

Figure 5:
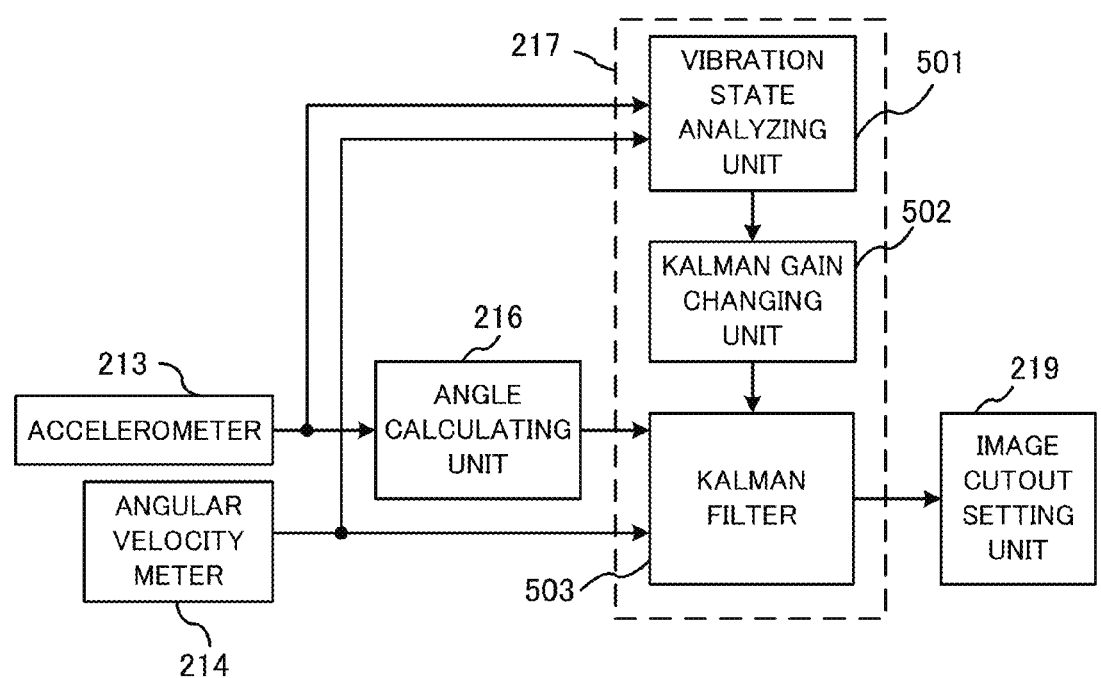
FIG. 5 is a block diagram of a controller (tilt correction apparatus) in Embodiment 1.

Next, referring to FIG. 5, a method of calculating the absolute angle depending on a vibration condition of the image pickup apparatus 101 using a Kalman filter based on the angle detected by the accelerometer 213 and the angular velocity detected by the angular velocity meter 214 will be described. FIG. 5 is a block diagram of the controller 215 (tilt correction apparatus), and it illustrates an inside of the horizontal angle calculating unit 217 in detail. As illustrated in FIG. 5, the horizontal angle calculating unit 217 includes a vibration state analyzing unit 501 (analyzing unit), a Kalman gain changing unit 502 (gain changer), and a Kalman filter 503.

The angle calculating unit 216 calculates the roll angle based on the acceleration (acceleration information) detected by the accelerometer 213. The roll angle calculated by the angle calculating unit 216 and the roll angular velocity detected by the angular velocity meter 214 are input to the Kalman filter 503.

Next, a method of calculating the absolute angle by using the Kalman filter 503 will be described. In this embodiment, a state variable is denoted by x=[angle Gyrobias]$^T$ (angle: absolute angle, Gyrobias: offset bias component of the angular velocity meter 214), and a sampling period of the calculation by the Kalman filter 503 is denoted by dt. An output y indicates the absolute angle (roll angle) output from the angle calculating unit 216, and an input u indicates the angular velocity (roll angular velocity) output from the angular velocity meter 214. In this case, state equations as represented by expressions (1) and (2) below are satisfied.

$$x_{k+1} = Ax_k + Bu_k + Gw_k \qquad (1)$$
$$y_k = Cx_k + v_k$$
$$A = \begin{bmatrix} 1 & -dt \\ 0 & 1 \end{bmatrix},$$
$$B = \begin{bmatrix} dt \\ 0 \end{bmatrix}, G = \begin{bmatrix} 0 \\ 1 \end{bmatrix},$$
$$C = [1\ 0], D = [0]$$

$$E[w(t)] = 0,\ E[w(t)w^T(\tau)] = Q\delta(t-\tau) \qquad (2)$$
$$E[v(t)] = 0,\ E[v(t)v^T(\tau)] = R\delta(t-\tau)$$

In expressions (1) and (2), symbol $w_k$ is a system noise (noise of the angular velocity meter 214), symbol $v_k$ is an observation noise (noise generated during the calculation of the angle by using the accelerometer 213, which is mainly caused by the vibration acceleration).

According to expressions (1) and (2), as represented by expressions (3) to (7) below, a Kalman gain $g_k$ and a state estimation value $\hat{x}_k$ can be obtained.

(ADVANCE PREDICTION STEP)

$$\hat{x}_k^- = A\hat{x}_{k-1} + Bu_{k-1} \quad (3)$$

$$P_k^- = AP_{k-1}A^T + BQB^T \quad (4)$$

(FILTERING STEP)

$$g_k = \frac{P_k^- C^T}{CP_k^- C^T + R} \quad (5)$$

$$\hat{x}_k = \hat{x}_k^- + g_k(y_k - C\hat{x}_k^-) \quad (6)$$

$$P_k = (I - g_k C)P_k^- \quad (7)$$

In this embodiment, a variance $Q=\sigma_w^2$ of a system noise and a variance $R=\sigma_v^2$ of an observation noise are set as follows. A value (set value) of the variance Q of the system noise is set based on a sensor noise of the angular velocity meter 214 as a system noise applied to an input terminal. The variance R of the observation noise is set based on a noise (noise caused by an influence of the vibration acceleration to the accelerometer 213) contained in an angle corresponding to an output of the angle calculating unit 216 as an output signal.

The Kalman gain $g_k$ changes depending on the variances Q and R. The variance Q depends on an output noise of the angular velocity meter 214, and accordingly it is set as a constant value without changes depending on a certain condition. On the other hand, the variance R is affected by the influence of the noise of the vibration acceleration received by the accelerometer 213, and accordingly it changes depending on a vibration condition of the image pickup apparatus 101. When an image is captured by holding the image pickup apparatus 101 firmly or an image capturing condition is determined while the image pickup apparatus 101 is fixed to a tripod, the vibration acceleration does not substantially occur, and accordingly it is preferred that the variance R is set to be small. On the other hand, when a user captures an image while walking with the image pickup apparatus 101 held by hand, the user captures an image while fixing and attaching the image pickup apparatus 101 to a part of a body of the user, or the user captures an image while attaching the image pickup apparatus 101 to a machine such as a vehicle and a motorcycle, the vibration acceleration is large and accordingly it is preferred that the variance R is set to be large. However, since the acceleration caused by the vibration varies in each case, it is difficult to calculate the absolute angle independently of the vibration condition while keeping the Kalman gain $g_k$ to be a constant value.

If the Kalman gain $g_k$ can be set according to the vibration condition, it is possible to calculate an optimum absolute angle depending on the vibration condition of the image pickup apparatus 101 with a simple configuration. Accordingly, the output of the accelerometer 213 and the output of the angular velocity meter 214 are input to the vibration state analyzing unit 501, and the vibration state of the image pickup apparatus 101 is detected based on information of each sensor. The Kalman gain changing unit 502 changes the Kalman gain $g_k$ for each vibration state depending on the detected vibration state, and the changed Kalman gain $g_k$ is reflected to the Kalman filter 503. Thus, the calculation of an optimum absolute angle can be performed.

Next, an analysis of the vibration state by the vibration state analyzing unit 501 will be described. First, a method of analyzing the vibration state using the output signal of the accelerometer 213 will be described. The vibration noise added to the output signal of the angle calculating unit 216 is determined depending on the vibration acceleration output from the accelerometer 213 in addition to the gravity acceleration. Therefore, the image pickup apparatus 101 detects an acceleration other than the received gravity from the output signal of the accelerometer 213 to calculate the vibration state.

Hereinafter, an example of a method of determining an influence of the acceleration other than the gravity based on the output signal of the accelerometer 213 will be described. When the image pickup apparatus 101 is in a still state and it is not affected by the influence of the acceleration from an external apparatus, the acceleration detected by the accelerometer 213 is only the gravity acceleration 1 G(=9.8 m/s²). The accelerometer 213 has a relation in which the X axis, the Y axis, and the Z axis are orthogonal to each other, and it is a triaxial acceleration sensor which is capable of detecting the acceleration for each axis. If the accelerometer 213 does not receive the acceleration other than the gravity acceleration, an acceleration obtained by synthesizing the accelerations detected for the three axes is the gravity acceleration. When a synthesized acceleration is σ, an acceleration for the X axis is αx, an acceleration for the Y axis is αy, and an acceleration for the Z axis is αz, the synthesized acceleration σ is represented by expression (8) below on condition that the image pickup apparatus 101 does not receive the acceleration other than the gravity acceleration.

$$\text{SYNTHESIZED ACCELERATION } \sigma = \sqrt{(\alpha x^2 + \alpha y^2 + \alpha z^2)} = \text{GRAVITY ACCELERATION} \quad (8)$$

On the other hand, when the image pickup apparatus 101 is affected by the influence of an acceleration other than the gravity acceleration, the synthesized acceleration σ is not equal to the gravity acceleration. Accordingly, a vibration acceleration β (i.e., shake acceleration) as an acceleration component other than the gravity acceleration added to the image pickup apparatus 101 can be extracted as a component obtained by subtracting the gravity acceleration from the synthesized acceleration (vibration acceleration β=synthesized acceleration σ−gravity acceleration). In this embodiment, the vibration state can be detected by a method of comparing the number of times by which the absolute value of the vibration acceleration β is over a predetermined threshold value (predetermined value) within a certain time range with a predetermined threshold value (predetermined number), and then determining that the vibration state is a small vibration state if the number is not greater than the predetermined threshold value, and determining that the vibration state is a large vibration state if the number is greater than the predetermined threshold value. Alternatively, the vibration state can be detected by a method of comparing a signal generated by a moving average, a LPF, or the like based on the absolute value of the signal of the vibration acceleration β with a predetermined threshold value, and then determining that the vibration state is the small vibration state if the signal is not greater than the predetermined threshold value, and determining that the vibration state is the large vibration state if the signal is greater than the predetermined threshold value.

Next, a method of analyzing the vibration state by using the output signal of the angular velocity meter 214 will be described. During the detection of the vibration state by the vibration state analyzing unit 501 in the horizontal angle calculating unit 217, the roll angular velocity output from the angular velocity meter 214 is input. The roll angular velocity contains a low-frequency component noise as a noise of the angular velocity meter 214. Accordingly, an absolute value conversion is performed on the roll angular velocity after it passes through the HPF. Then, the vibration state can be detected by a method of comparing the number of times by which the roll angular velocity after the conversion of the absolute value is performed is over a predetermined threshold value (predetermined value) within a predetermined time with a predetermined threshold value (predetermined number), and determining that the vibration state is a small vibration state if the number is not greater than the predetermined threshold value, and determining that the vibration state is a large vibration state if the number is greater than the predetermined threshold value. Alternatively, the vibration state can be detected by a method of comparing a signal generated by a moving average, a LPF, or the like based on the signal of the roll angular velocity after the conversion of the absolute value is performed with a predetermined threshold value, and then determining that the vibration state is the small vibration state if the signal is not greater than the predetermined threshold value, and determining that the vibration state is the large vibration state if the signal is greater than the predetermined threshold value.

As described above, with respect to the roll angle calculated by the angle calculating unit 216, the vibration state is detected by using the roll angular velocity output from the angular velocity meter 214. During the detection in the tilt direction by the tilt angle calculating unit 218, the vibration state is detected by using the pitch angular velocity from the angular velocity meter 214 when the tilt direction is the pitch direction (pitch angle), and on the other hand, the vibration state is detected by using the yaw angular velocity from the angular velocity meter 214 when the tilt direction is the yaw direction (yaw angle). Alternatively, the vibration state may be detected by using an added value of the pitch angular velocity, the yaw angular velocity, and the roll angular velocity.

By using the above method, the vibration state analyzing unit 501 can detect the vibration state by using any of the output signals of the accelerometer 213 and the angular velocity meter 214. When both states of the vibration state using the output signal of the accelerometer 213 and the vibration state using the output signal of the angular velocity 214 are used, the vibration state can be detected with higher accuracy. In other words, the vibration state can be determined as a large vibration state if it is determined that the vibration is large based on one of the output signals of the accelerometer 213 or the angular velocity meter 214, and the vibration state can be determined as a small vibration state if it is determined that both of the vibrations are small.

The vibration state detected by the vibration state analyzing unit 501 is input to the Kalman gain changing unit 502, and a Kalman gain which is previously parameterized according to a vibration state is selected. The selected Kalman gain is input to the Kalman filter 503 to set the Kalman gain in the Kalman filter 503 to calculate the absolute angle according to the vibration state, and then the absolute angle is sent to the image cutout setting unit 219. Thus, the horizontal angle calculating unit 217 can calculate the roll absolute angle. Furthermore, with respect to the tilt angle calculating unit 218, the calculation can be performed similarly to the method described referring to FIG. 5 based on the pitch angle or the yaw angle output from the angle calculating unit 216 and the pitch angular velocity or the yaw angular velocity of the output signal of the angular velocity meter 214.

Figure 6:
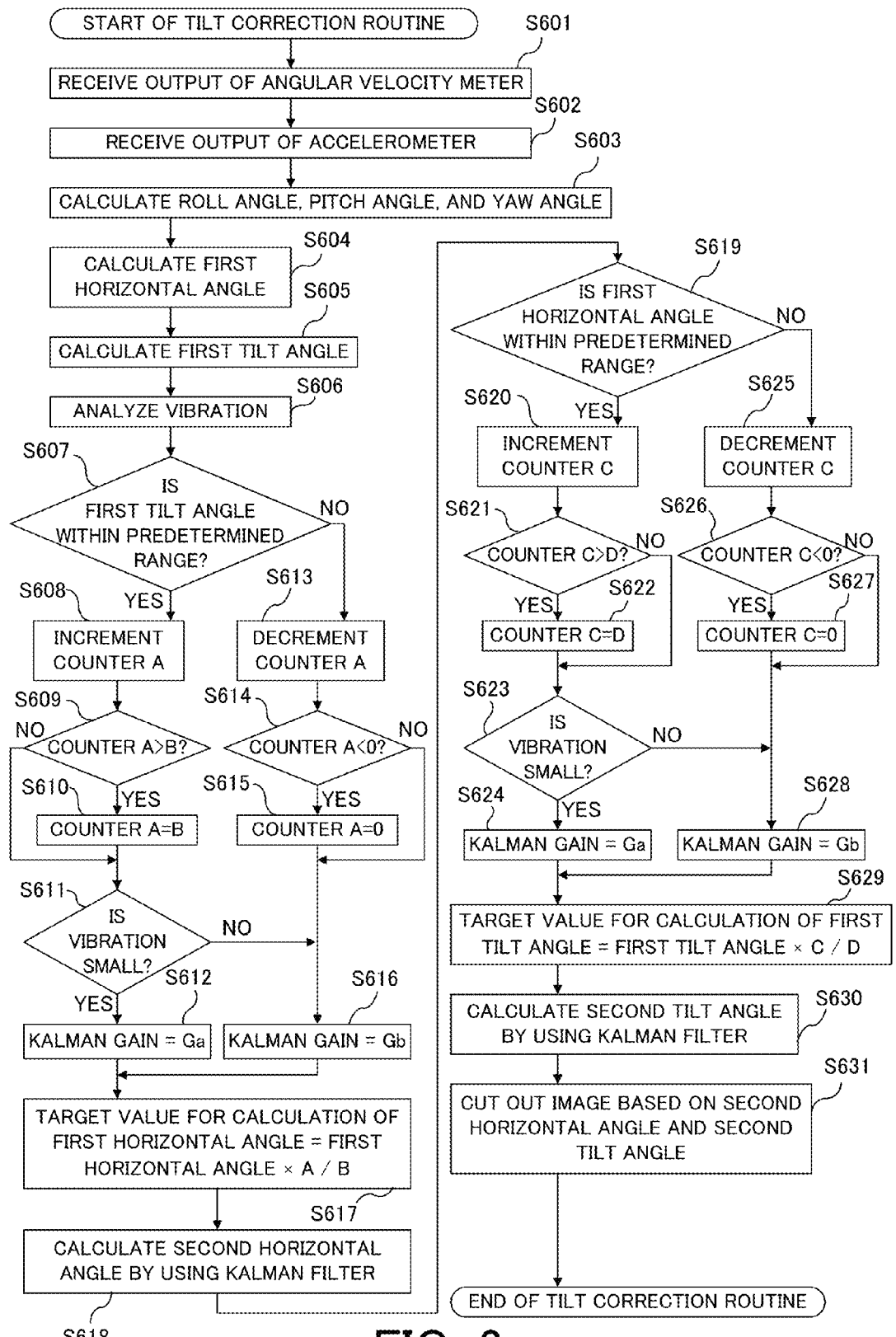
FIG. 6 is a flowchart of illustrating tilt correction processing by the image pickup apparatus in Embodiment 1.

Next, referring to FIG. 6, the tilt correction processing of the image pickup apparatus 101 in this embodiment will be described. FIG. 6 is a flowchart of illustrating the tilt correction processing of the image pickup apparatus 101. The flow illustrated in FIG. 6 starts when a power of the image pickup apparatus 101 is on and an instruction to turn on the tilt correction function is given via the operation portion 212, and it repeats with a predetermined sampling period. Each step in FIG. 6 is performed mainly by the controller 215.

First, at step S601, the controller 215 receives the output signal from the angular velocity meter 214 (i.e., angular velocity detected by the angular velocity meter 214). Then, at step S602, the controller 215 receives the output signal from the accelerometer 213 (i.e., acceleration detected by the accelerometer 213). Subsequently, at step S603, the angle calculating unit 216 calculates the roll angle, the pitch angle, and the yaw angle based on the output values of the triaxial acceleration of the accelerometer 213.

Subsequently, at step S604, the horizontal angle calculating unit 217 sets, as a first horizontal angle, the roll angle calculated by the angle calculating unit 216. Then, at step S605, the tilt angle calculating unit 218 determines as to whether either the pitch angle or the yaw angle is set as a first tilt angle based on the roll angle calculated by the angle calculating unit 216. The tilt angle calculating unit 218 sets, as the first tilt angle, one of the pitch angle and the yaw angle as a result of the determination. For example, when the roll angle is within a predetermined angle range (for example, an angle within ±45 degrees, an angle from 135 to 180 degrees, or an angle from −135 to −180 degrees with reference to a normal position of the image pickup apparatus 101), the pitch angle is set as the first tilt angle. On the other hand, when the roll angle is outside the predetermined angle range, the yaw angle is set as the first tilt angle.

Subsequently, at step S606, the vibration state analyzing unit 501 performs a vibration analysis to determine whether the image pickup apparatus 101 is in the large vibration state or in the small vibration state. Then, at step S607, the tilt angle calculating unit 218 determines whether the first tilt angle calculated at step S605 is within a predetermined range (for example, within ±30 degrees with reference to a normal position of the image pickup apparatus 101). When the first tilt angle is within the predetermined range, the flow proceeds to step S608. On the other hand, when the first tilt angle is outside the predetermined range, the flow proceeds to step S613.

At step S608, the controller 215 increments a counter A. Then, at step S609, the controller 215 determines whether the counter A is greater than a threshold value B (predetermined threshold value). When the counter A is greater than the threshold value B, the flow proceeds to step S610. Then, at step S610, the controller 215 sets the counter A to the threshold value B, and the flow proceeds to step S611. On the other hand, when the counter A is not greater than the threshold value B at step S609, the flow proceeds to step S611 and processing is performed so that the counter A is not greater than the threshold value B.

At step S611, the controller 215 (vibration state analyzing unit 501) determines whether the vibration state is the small vibration state based on the vibration state determined at step S606. For example, the controller 215 determines that the vibration state is the small vibration state if the vibration is smaller than a predetermined amount, and it determines that the vibration state is the large vibration state if the vibration is not less than the predetermined amount. When the vibration state is the small vibration state, the flow proceeds to step S612. At step S612, the Kalman gain changing unit 502 sets Ga as a Kalman gain, and the flow proceeds to step S617. In this embodiment, the Kalman gain Ga is set so that the variance R of the observation noise is reduced. This is because the vibration noise of the output of the accelerometer 213 is small and the horizontal angle can be calculated accurately from the output of the accelerometer 213 when the vibration state is the small vibration state.

On the other hand, when it is determined that the vibration state is not the small vibration state at step S611, the flow proceeds to step S616. At step S616, the Kalman gain changing unit 502 sets Gb as the Kalman gain, and the flow proceeds to step S617. The Kalman gain Gb is set as a Kalman gain in the large vibration state. The Kalman gain Gb is set so that the variance R of the observation noise increases. When the vibration state is the large vibration state, the vibration noise of the output of the accelerometer 213 is large and accordingly it is difficult to calculate the horizontal angle accurately. Therefore, a weight to be used for the correction by the output of the angular velocity meter 214 increases, and accordingly a highly reliable angle (absolute angle) can be calculated by using the Kalman filter 503. As described above, by setting the Kalman gain according to the vibration state, the absolute angle calculated by the Kalman filter 503 is a highly reliable angle.

On the other hand, when the first tilt angle is outside the predetermined range at step S607, the controller 215 decrements the counter A at step S613, and the flow proceeds to step S614. At step S614, the controller 215 determines whether the counter A is smaller than 0. When the counter A is smaller than 0, the controller 215 sets the counter A to 0 at step S615, and the flow proceeds to step S616. On the other hand, when the counter A is greater than or equal to 0 at step S614, the flow proceeds to step S616, and processing is performed so that the counter A is not a value smaller than 0. Then, at step S616, the Kalman gain changing unit 502 sets Gb as the Kalman gain and the flow proceeds to step S617. The Kalman gain Gb is set so that the variance R of the observation noise increases. When the tilt angle is large, an error increases during the calculation of the horizontal tilt angle and it is difficult to perform the horizontal correction (correction of the horizontal angle) accurately, and accordingly such processing is performed.

Subsequently, at step S617, the controller 215 (angle calculating unit 216, and horizontal angle calculating unit 217) multiplies the first horizontal angle calculated at step S604 by the counter A, and it is divided by the threshold value B. Accordingly, a value of A/B is set between 0 and 1, and the value of A/B is 1 when the first tilt angle is within the predetermined range, and the value of the first horizontal angle itself is set as a target value for calculating the first horizontal angle. When the first tilt angle is set outside the predetermined range in a predetermined time, the value of A/B is 0 and the target value for calculating the first horizontal angle is set to 0. During the switching time period of the tilt angle, the value of A/B is set between 0 and 1 by the calculation processing for the counter A at steps S607 to S617, and accordingly the switching can be smoothly connected. Therefore, it is possible to connect the target value for calculating the first horizontal angle to the first horizontal angle or 0 in a predetermined time from the moment the tilt angle is switched at a predetermined value. When the tilt angle is large and it is difficult to perform the horizontal correction (correction of the horizontal angle) accurately at steps S607 to S617, the weight of the output of the angular velocity meter 214 increases to calculate the angle, and as a result, an output error contained in a large tilt angle can be reduced.

Subsequently, at step S618, the controller 215 (horizontal angle calculating unit 217) calculates a second horizontal angle by using the Kalman filter 503. The second horizontal angle is calculated based on the target value, calculated by the angle calculating unit 216 at step S617, for calculating the first horizontal angle, the angular velocity, acquired at step S601, as an output signal from the angular velocity meter 214, and the set Kalman gain.

Subsequently, at step S619, the controller 215 (horizontal angle calculating unit 217) determines whether the first horizontal angle is within a predetermined range (for example, within ±30 degrees). When the first horizontal angle is within the predetermined range, the flow proceeds to step S620. On the other hand, when the first horizontal angle is outside the predetermined range, the flow proceeds to step S625.

At step S620, the controller 215 increments a counter C, and then the flow proceeds to step S621. Subsequently, at step S621, the controller 215 determines whether the counter C is greater than a threshold value D (predetermined threshold value). When the counter C is greater than the threshold value D, the controller 215 sets the counter C to the threshold value D at step S622, and then the flow proceeds to step S623. On the other hand, when the counter C is not greater than the threshold value D at step S621, the flow proceeds to step S623 and processing is performed so that the counter C is not a value greater than the threshold value D.

At step S623, the controller 215 (vibration state analyzing unit 501) determines whether the vibration state is the small vibration state based on the result of the vibration state determined at step S606. When it is the small vibration state, the flow proceeds to step S624. At step S624, the Kalman gain changing unit 502 sets Ga as the Kalman gain, and then the flow proceeds to step S629. On the other hand, when it is determined that the it is not the small vibration state at step S623, the Kalman gain changing unit 502 sets Gb as the Kalman gain at step S628, and then the flow proceeds to step S629. An effect generated by the change of the Kalman gain according to the vibration state is the same as that described at steps S612 and S616, and therefore appropriate calculation of the absolute angle according to the vibration state can be performed.

On the other hand, when the first horizontal angle is outside the predetermined range at step S619, the controller 215 decrements the counter C at step S625, and then the flow proceeds to step S626. At step S626, the controller 215 determines whether the counter C is smaller than 0. When the counter C is smaller than 0, the controller 215 sets the counter C to 0 at step S627, and then the flow proceeds to step S628. On the other hand, when the counter C is greater than or equal to 0 at step S626, the flow proceeds to step S628 and processing is performed so that the counter C is not a value smaller than 0. Then, at step S628, the Kalman gain changing unit 502 sets Gb as the Kalman gain and the flow proceeds to step S629. As a result, similarly to the effect described at step S616, a deterioration of controllability due to the erroneous calculation of the tilt angle can be reduced when it is difficult to calculate the tilt angle accurately.

At step S629, the controller 215 (angle calculating unit 216, and tilt angle calculating unit 218) multiplies the first tilt angle calculated at step S605 by the counter C, and it is divided by the threshold value D. Accordingly, a value of C/D is set between 0 and 1, and the value of C/D is 1 when the first horizontal angle is within the predetermined range, and the value of the first tilt angle itself is set as a target value for calculating the first tilt angle. When the first horizontal angle is set outside the predetermined range in a predetermined time, the value of C/D is 0 and the target value for calculating the first tilt angle is set to 0. During the switching time period of the horizontal angle, the value of C/D is set between 0 and 1 by the calculation processing for the counter C at steps S619 to S627, and accordingly the switching can be smoothly connected. Therefore, it is possible to connect the target value for calculating the first tilt angle to the first tilt angle or 0 in a predetermined time from the moment the horizontal angle is switched at a predetermined value. When the horizontal angle has a value by which it is difficult to perform the tilt correction (correction of the tilt angle) accurately at steps S619 to S629, the weight of the output of the angular velocity meter 214 increases to calculate the angle, and as a result, an output error contained in a large tilt angle can be reduced.

Subsequently, at step S630, the controller 215 (tilt angle calculating unit 218) calculates a second tilt angle by using the Kalman filter 503. The second tilt angle is calculated based on the target value for calculating the first tilt angle calculated by the angle calculating unit 216 at step S629, the angular velocity, acquired at step S601, as an output signal from the angular velocity meter 214, and the set Kalman gain.

Subsequently, at step S631, the image cutout setting unit 219 sets an image cutout region to correct the angle based on the second horizontal angle calculated at step S618 and the second tilt angle calculated at step S630. Then, the image processing unit 206 cuts out an image according to the image cutout region set by the image cutout setting unit 219 to perform the angle correction. Thus, the correction routine illustrated in FIG. 6 is finished. The angle correction processing is performed with a predetermined sampling period, based on the calculated first horizontal angle and second tilt angle.

As described above, rotation processing is performed on a captured image for each frame of a moving image depending on the angle of the image pickup apparatus 101 to perform the cutout processing. Accordingly, independently of the vibration state, the tilt correction with respect to a plane that is perpendicular to the gravity direction of the image pickup element in a wide frequency band can be performed with high accuracy. Furthermore, when capturing a still image instead of capturing the moving image, it is possible to perform the tilt correction by calculating the absolute angle of the image pickup apparatus 101 during capturing the still image to perform the rotation processing of the captured image based on the obtained absolute angle.

Alternatively, the tilt correction can be performed by using a method of an optical correction in which the optical lens or the image pickup element is shifted based on the calculated absolute angle. Furthermore, the correction may be performed by a rotation motion of the image pickup element around the optical axis, or alternatively the correction may be performed by rotating a body (barrel) including the optical lens and the image pickup element integrated with each other based on the absolute angle. By using any methods, the tilt with respect to the plane that is perpendicular to the gravity direction of the image pickup element can be corrected with high accuracy in a wide frequency band. However, when the optical correction is to be performed, the correction with respect to the horizontal direction cannot be performed only by the correction with respect to the tilt direction. When the correction is to be performed by the rotation motion of the image pickup element around the optical axis, the correction with respect to the tilt direction cannot be performed only by the correction with respect to the horizontal direction.

Figure 7:
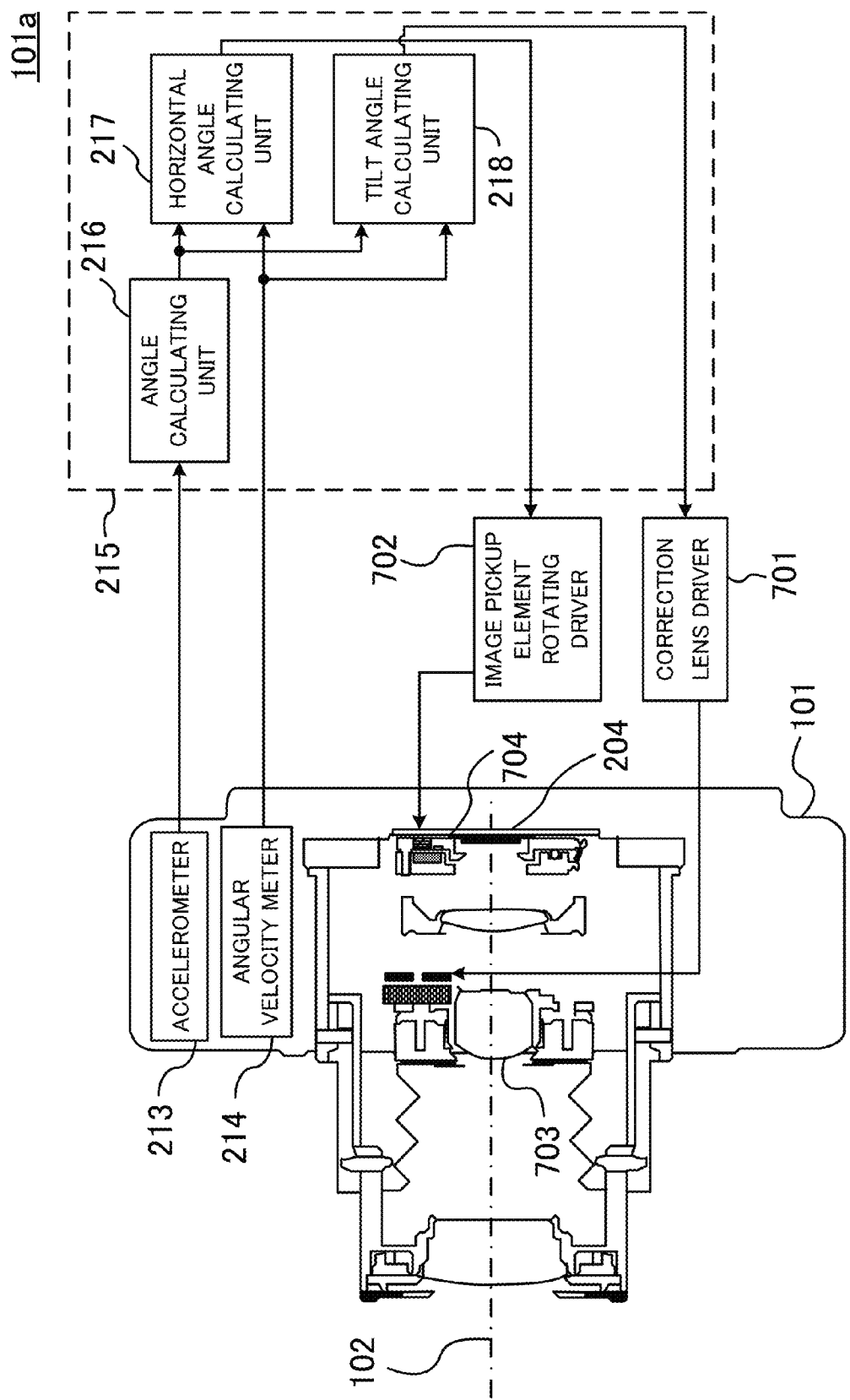
FIG. 7 is a block diagram of the image pickup apparatus in Embodiment 1.

Next, referring to FIG. 7, tilt correction processing by a mechanical drive in this embodiment will be described. FIG. 7 is a block diagram of an image pickup apparatus 101a, and it illustrates a configuration which includes a mechanism for performing a shift drive of a lens (optical shift lens) and a mechanism for a rotation drive of an image pickup element.

The horizontal angle calculating unit 217 and the tilt angle calculating unit 218 calculate a horizontal correction angle and a tilt correction angle based on output signals of the accelerometer 213 and the angular velocity meter 214. The processing is the same as the method described referring to FIG. 2. As illustrated in FIG. 7, the output signal of the tilt angle calculating unit 218 is input to a correction lens driver 701 (drive unit). The correction lens driver 701 amplifies the output signal of the tilt angle calculating unit 218 based on a focal length calculated by zoom position information obtained from a zoom unit 201 and a lens sensitivity to set a shift lens target value. This is because it is necessary to correct a change of a vibration correction sensitivity on an image plane of the image pickup apparatus 101a for a vibration correction stroke of the shift lens caused by a change of optical information of the lens. The correction lens driver 701 performs the shift drive of a shift lens unit 703 (correction lens), i.e., moves the shift lens unit 703 in a direction orthogonal to an optical axis 102, according to the shift lens target value to perform the tilt angle correction.

The output signal from the horizontal angle calculating unit 217 is input to an image pickup element rotating driver 702. The image pickup element rotating driver 702 (drive unit) drives an image pickup element rotator 704 according to a rotation target value obtained from the horizontal angle calculating unit 217 to perform horizontal angle correction. By the method described above, the tilt correction by a mechanical drive can be performed. In this embodiment, the driver may be configured to drive a body configured by integrating the shift lens unit 703 with the image pickup unit 204 (image pickup element).

[Embodiment 2]

Next, an image pickup apparatus in Embodiment 2 of the present invention will be described. In Embodiment 1, the method of performing the tilt correction by calculating the absolute angle depending on the vibration state is described. Actually, however, the range (movable range) in which the tilt correction is possible may be limited in many cases. For example, when the electronic image blur correction is performed by the image cutout, the range in which the tilt correction is possible is limited depending on a ratio of an image to be cut out determined in advance. Furthermore, with respect to the angle correction using a mechanical mechanism, the correctable range is limited depending on a maximum drivable amount of the mechanical mechanism.

When an amount of the correction exceeds the movable range during the tilt correction performed by using the absolute angle calculated in Embodiment 1, a correction angle is fixed to a maximum correction angle, and accordingly the vibration correction of a high frequency component is not effective and a disturbance in an image caused by an image blur may be prominent. Accordingly, in this embodiment, a method capable of performing the tilt correction and the vibration correction (angle correction for a high frequency) appropriately within the limited movable range will be described.

Figure 8:
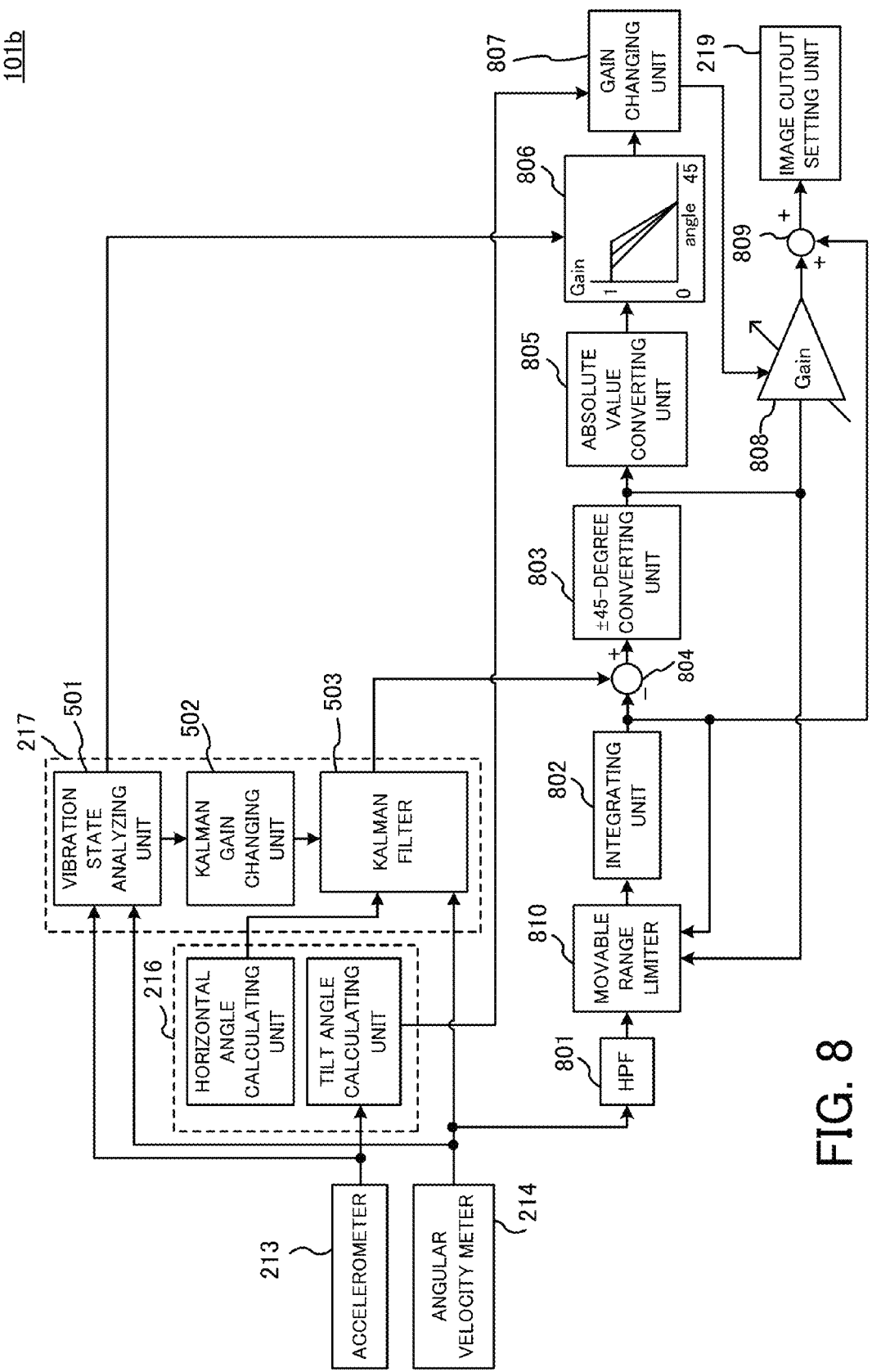
FIG. 8 is a block diagram of an image pickup apparatus in Embodiment 2.

FIG. 8 is a block diagram of an image pickup apparatus 101b (tilt correction apparatus) in this embodiment, and the same parts as those of the image pickup apparatus 101 in Embodiment 1 described referring to FIG. 5 are denoted by the same reference numerals. The image pickup apparatus 101b in this embodiment synthesizes a low-frequency removed angle that is calculated by integration after cutting a low frequency component from the output signal of the angular velocity meter 214 with the absolute angle calculated by using the Kalman filter 503 to perform the tilt correction and the vibration correction within the movable range of the tilt correction. In this respect, the image pickup apparatus 101b in this embodiment is different from the image pickup apparatus 101 in Embodiment 1 in which the angle calculated by using the Kalman filter 503 is input to the image cutout setting unit 219 and the cutout processing with rotation is performed on the captured image to perform the tilt correction.

The output signal from the angular velocity meter 214 is input to a HPF 801 (high-pass filter). This signal is input to a movable range limiting unit 810 (movable range limiter) after a DC component contained in the signal is cut, and signal processing is performed on aHPF-applied angular velocity(angular velocity output from the HPF 801) so that a low-frequency removed angle is within the set movable range. The processing performed by the movable range limiting unit 810 will be described below. An integrating unit 802 (integrator) performs integration processing on the angular velocity as an output signal from the movable range limiting unit 810, and thus a low-frequency removed vibration correction angle is calculated. The absolute angle output from the Kalman filter 503 and the output signal from the integrating unit 802 are input to a subtractor 804. The subtractor 804 subtracts the low-frequency removed vibration correction angle from the absolute angle obtained from the Kalman filter 503.

Figure 9:
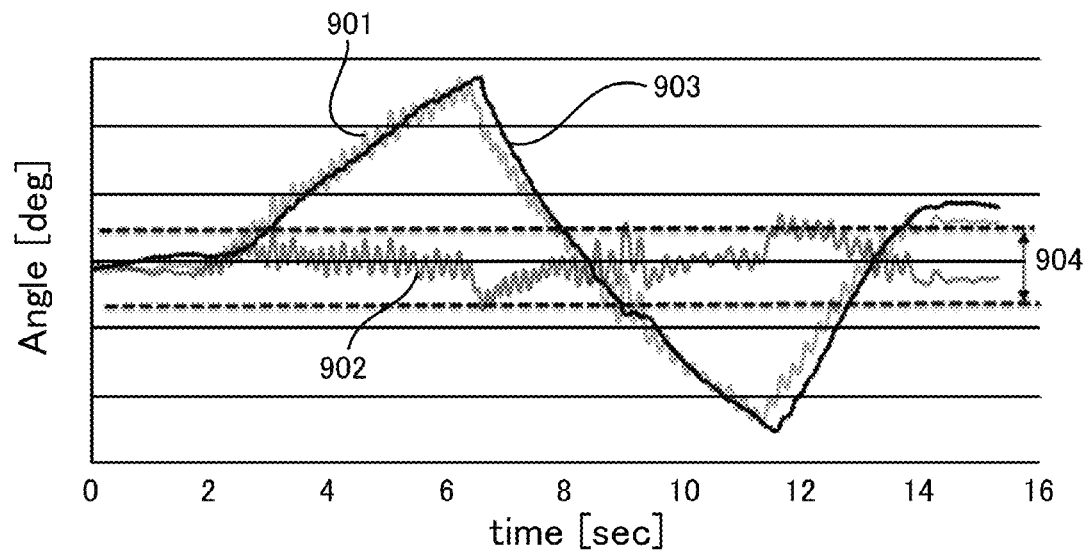
FIG. 9 is an explanatory diagram of an angle waveform of the image pickup apparatus in Embodiment 2.

FIG. 9 is an explanatory diagram of an angle waveform of the image pickup apparatus 101b. In FIG. 9, reference numeral 901 denotes the absolute angle which is output from the Kalman filter 503, reference numeral 902 denotes the low-frequency removed vibration correction angle which is output from the integrating unit 802, and reference numeral 903 denotes the output of the subtractor 804.

The output of the subtractor 804 is input to a ±45-degree converting unit 803 (±45-degree converter). The ±45-degree converting unit 803 converts the input signal having an angle value of ±180 degrees from the subtractor 804 to an angle value of ±45 degrees. In this embodiment, the tilt of the image pickup apparatus 101b with reference to a position where the image pickup element is located in a direction perpendicular to the gravity direction is 0 degree (i.e., normal position). When the subtracted angle is larger than +45 degrees and is smaller or equal to +135 degrees, the ±45-degree converting unit 803 subtracts 90 degrees from the angle of the image pickup apparatus 101b. When the absolute angle is larger than +135 degrees and is smaller than or equal to +180 degrees, the ±45-degree converting unit 803 subtracts 180 degrees from the angle of the image pickup apparatus 101b. When the absolute angle is smaller than or equal to −45 degrees and is larger than −135 degrees, the ±45-degree converting unit 803 adds 90 degrees to the angle of the image pickup apparatus 101b. When the absolute angle is smaller than or equal to −135 degrees and is larger than −180 degrees, the ±45-degree converting unit 803 adds 180 degrees to the angle of the image pickup apparatus 101b. By such processing, the angle of the image pickup apparatus 101b is converted to an angle within a range of ±45 degrees centered at 0, 90, −90, or 180 degrees.

This is processing to determine a reference position for performing the tilt correction. The reference position is different depending on whether the image pickup apparatus 101b is held at a horizontal position (normal position) or at a vertical position. When the image pickup apparatus 101b is held at the horizontal position, a position in which a horizontal direction axis of the image pickup element is perpendicular to the gravity direction is set as the reference position and its angle is set as a reference angle (0 degree), and accordingly the tilt correction is performed to keep horizontal with respect to the reference angle. On the other hand, when the image pickup apparatus 101b is held at the vertical position, a position in which a vertical direction of the image pickup element is perpendicular to the gravity direction is set as the reference position, and accordingly each of positions rotated by ±90 degrees from the normal position of the image pickup apparatus 101b is set as the reference angle (0 degree) to perform the tilt correction.

The output signal of ±45-degree converting unit 803 is input to a variable gain 808. The gain of the variable gain 808 is set between 0 and 1, inclusive, and the output signal of the variable gain 808 and the output signal of the integrating unit 802 are input to an adding unit 809 (adder) to add the signal obtained by multiplying the gain (i.e., signal obtained by multiplying an output 903 by the gain) to the low-frequency removed vibration correction angle 902.

When the gain of the variable gain 808 is 1, the output of the adding unit 809 is the same value as that obtained by performing the ±45-degree conversion on the absolute angle as an output of the Kalman filter 503. On the other hand, when the gain of the variable gain 808 is 0, the output of the adding unit 809 is the same value as that of the low-frequency removed vibration correction angle 902 as an output of the integrating unit 802. When the gain of the variable gain 808 is between 0 and 1, the synthesis ratio of the absolute angle and the low-frequency removed vibration correction angle varies depending on the gain. The correction angle as an output of the adding unit 809 is input to the image cutout setting unit 219, and the tilt correction is performed by the image cutout based on the correction angle.

Next, a method of setting the gain of the variable gain 808 will be described. The output of the ±45-degree converting unit 803 is input to an absolute value converting unit 805 (absolute value converter) as well, and it is converted to an absolute value. The output of the absolute value converting unit 805 is input to a gain table 806. For example, when an angle obtained after converting the absolute value is within a predetermined first angle threshold value, the gain table 806 sets the gain to 1. On the other hand, when the angle obtained after converting the absolute value is at least a predetermined second angle threshold value, the gain table 806 sets the gain to 0. When the angle after converting the absolute value is between the predetermined first angle threshold value and the predetermined second angle threshold value, the gain table 806 linearly interpolates the gain between 0 and 1. In this embodiment, while the table is created by using two points and a region between the two points is linearly interpolated, a table can be created by using three or more points.

In FIG. 9, when the output 903 of the subtractor 804 is within a range 904 which is set to the first angle threshold value, the gain is set to 1. On the other hand, when the output 903 is outside the range 904, the gain decreases from 1 and it is set to 0 at the predetermined second angle threshold value or more.

The gain table 806 inputs the output of the vibration state analyzing unit 501 as well, and the gain table 806 changes depending on the vibration state. For example, the predetermined first angle threshold value of the gain table 806 is changed so that the relation of "a value set in a small vibration state">"a value set in a middle vibration state">"a value set in a large vibration state" is satisfied. As a result, since the image blur does not prominent due to the shake when the vibration is small, the tilt correction is performed by using a range as wide as possible with the movable range to give priority to a correction effect of the tilt correction. On the other hand, when the vibration is large, there is a possibility that a range for the tilt correction in a high frequency exceeds the movable range and the image blur which is unable to be corrected occurs if a wide range within the movable range is used for the tilt correction in a low frequency. Accordingly, by limiting the tilt correction, the effect of the vibration correction can be obtained.

The gain output from the gain table 806 is input to a gain changing unit 807 (gain changer). The gain changing unit 807 inputs the tilt angle output from the angle calculating unit 216 at the same time. When the tilt angle is within a predetermined range (for example, from −30 degrees to +30 degrees), the gain changing unit 807 determines that the horizontal angle calculated by the angle calculating unit 216 is a high reliable signal, and the gain as an output of the gain table 806 itself is directly output to the variable gain 808. On the other hand, when the tilt angle is outside the predetermined range, the gain changing unit 807 determines that the horizontal angle calculated by the angle calculating unit 216 is a low reliable signal, and the gain as an output of the gain table 806 is set to be gradually changed to 0 in a predetermined time period. When the tilt angle is changed to be within the predetermined range, the gain changing unit 807 resets the gain to be gradually changed to a gain value as an output of the gain table 806 in a predetermined time period. As described above, when the tilt angle is outside the predetermined range, the angle correction is performed by using the low-frequency removed vibration correction angle signal as an output of the integrating unit 802 in order to avoid an erroneous calculation in the tilt correction due to an erroneous calculation of the horizontal angle. As a result, it is possible to perform the tilt correction while reducing a problem of control due to an erroneous operation in the tilt correction.

Figure 10:
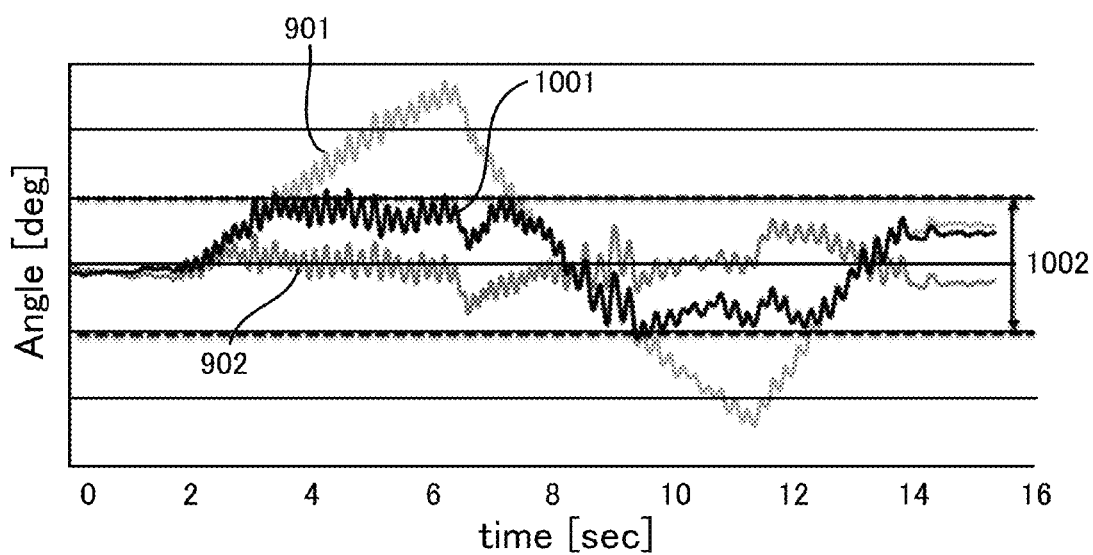
FIG. 10 is an explanatory diagram of an angle waveform of the image pickup apparatus in Embodiment 2.

FIG. 10 is an explanatory diagram of an angle waveform of the image pickup apparatus 101b, and it illustrates an example of a waveform of the correction angle as an output of the adding unit 809. Reference numeral 1001 denotes the output of the adding unit 809, and reference numeral 1002 denotes a movable range for the tilt correction.

An output 1001 of the adding unit 809 is calculated so as to be located within a movable range 1002 if possible, and the variable gain is set to 1 in the range 904 of FIG. 9 and accordingly the output 1001 of the adding unit 809 and the absolute angle 901 coincide with each other. On the other hand, the variable gain is set to be a value smaller than 1 outside the range 904 of FIG. 9. Accordingly, the synthesis ratio of the absolute angle 901 and the low-frequency removed vibration correction angle 902 in FIG. 9 changes depending on the variable gain, and finally the correction angle (output 1001) calculated so as to be located in the movable range 1002 can be obtained.

According to the method of this embodiment, the correction angle for the tilt correction can be calculated within the limited movable range. Therefore, even when the absolute angle of the image pickup apparatus 101b exceeds the movable range, the performance of the vibration correction control of the high frequency component is not damaged due to a hand shake. Furthermore, even when the absolute angle of the image pickup apparatus 101b exceeds the movable range, the tilt correction can be effectively performed at an angle close to the movable range.

Next, the movable range limiting unit 810 will be described. The movable range limiting unit 810 inputs an output of the HPF 801, and performs signal processing is performed so that the HPF-applied angular velocity (angular velocity output from the HPF 801) is within a predetermined movable range, and the processed signal is output to the integrating unit 802. The movable range limiting unit 810 inputs the low-frequency removed vibration correction angle as an output of the integrating unit 802 and the output of the ±45-degree converting unit 803 in addition to the output of the HPF 801.

When the absolute angle 901 as an output of the ±45-degree converting unit 803 exceeds the range 1002, the angle correction is performed by using the low-frequency removed vibration correction angle as an output of the integrating unit 802, and it is necessary to control the low-frequency removed vibration correction angle to be within the range 1002. Accordingly, the movable range limiting unit 810 limits the output from the HPF 801 so that the low-frequency removed vibration correction angle is within the range 1002.

FIGS. 11A to 11D are explanatory diagrams of control for limiting the movable range of the image pickup apparatus 101b, and they illustrate time-series data of signals processed by the movable range limiting unit 810 and the integrating unit 802. Reference numeral 1101 in FIG. 11A denotes the HPF-applied angular velocity (angular velocity output from the HPF 801). Reference numeral 1103 in FIG. 11B denotes a signal as an angle obtained by integrating the HPF-applied angular velocity 1101. If the movable range is not limited, the correction angle may be the signal 1103.

Actually, however, the movable range is limited, and the vibration correction cannot be performed in a time period in which the signal 1103 exceeds the movable range (between angles A2 and B2) if the movable range for image stabilization is limited between the angles A2 and B2 in FIG. 11B. Therefore, when the signal is to exceed the movable range, signal processing is performed to subtract the HPF-applied angular velocity 1101 by using (a previous sampling value of a control time period of) the angle output from the integrating unit 802 to integrate the angular velocity obtained by the subtraction processing. As a result, the correction angle can be calculated between the angles A2 and B2 of FIG. 11B as a movable range for the image stabilization.

An amount of subtracting the angular velocity is calculated by using tables illustrated in FIGS. 11C and 11D. In FIG. 11C, a horizontal axis indicates a target angle, and a vertical axis indicates a gain α. When the correction angle is smaller than or equal to A1, the gain α is 1. On the other hand, when the correction angle is larger than or equal to A2, the gain α is 0. When the correction angle is between A1 and A2, the gain α indicates a value between A1 and A2 obtained by linear interpolation. Also with respect to FIG. 11D, a gain β is obtained by the same method. In FIG. 11D, a horizontal axis indicates the correction angle, and a vertical axis indicates the gain β. When the correction angle (target angle)

is larger than or equal to B1, the gain β is 1. On the other hand, when the correction angle is smaller than or equal to B2, the gain β is 0. The correction angle is between B1 and B2, the gain β indicates a value between B1 and B2 obtained by linear interpolation. The gain for limiting the angular velocity is calculated by using the gains α and β, obtained as described above.

A movable-range limited angular velocity (angular velocity for limiting the movable range) output from the movable range limiting unit 810 is calculated by expressions (9) and (10) below, and the gain to be multiplied varies depending on a sign of the angular velocity.

ANGULAR VELOCITY IN POSITIVE DIRECTION: MOVABLE-RANGE LIMITED ANGULAR VELOCITY=ANGULAR VELOCITY×α (9)

ANGULAR VELOCITY IN NEGATIVE DIRECTION: MOVABLE-RANGE LIMITED ANGULAR VELOCITY=ANGULAR VELOCITY×β (10)

When the sign of the HPF-applied angular velocity 1101 as an output of the HPF 801 is positive, it is multiplied by the gain α. On the other hand, when the sign of the HPF-applied angular velocity 1101 is negative, it is multiplied by the gain β.

Reference numeral 1102 in FIG. 11A denotes the movable-range limited angular velocity (angular velocity for limiting the movable range) which is output from the movable range limiting unit 810. Reference numeral 1104 in FIG. 11B denotes a signal as an angle calculated by integrating the movable-range limited angular velocity 1102, and the correction angle is calculated between the movable range (i.e., between the angles A2 and B2). By using the method described above, the vibration correction control can be performed so that the angle is included in the limited movable range.

The movable range limiting unit 810 inputs the output of the ±45-degree converting unit 803, as well as the output value of the integrating unit 802. When the output of the ±45-degree converting unit 803 is greater than or equal to a positive movable range (for example, +5 degrees) and is less than or equal to a predetermined threshold value P (for example +20 degrees), it is preferred that the low-frequency removed vibration correction angle is limited so as not to be easily transferred to the positive side. Accordingly, the angles B1 and B2 as threshold values in FIG. 11B are changed to be values greater than normal values. When the output of the ±45-degree converting unit 803 is less than or equal to a negative movable range (for example, −5 degrees) and is greater than or equal to a predetermined threshold value M (for example −20 degrees), it is preferred that the low-frequency removed vibration correction angle is limited so as not to be easily transferred to the negative side. Accordingly, the angles A1 and A2 as threshold values are changed to be values smaller than normal values. When the output of the ±45-degree converting unit 803 is within the movable range (±5 degrees) and it is greater than the threshold value P or is smaller than the threshold value M, the angles A1, A2, B1, and B2 as threshold values are set to the normal values.

Figure 12:
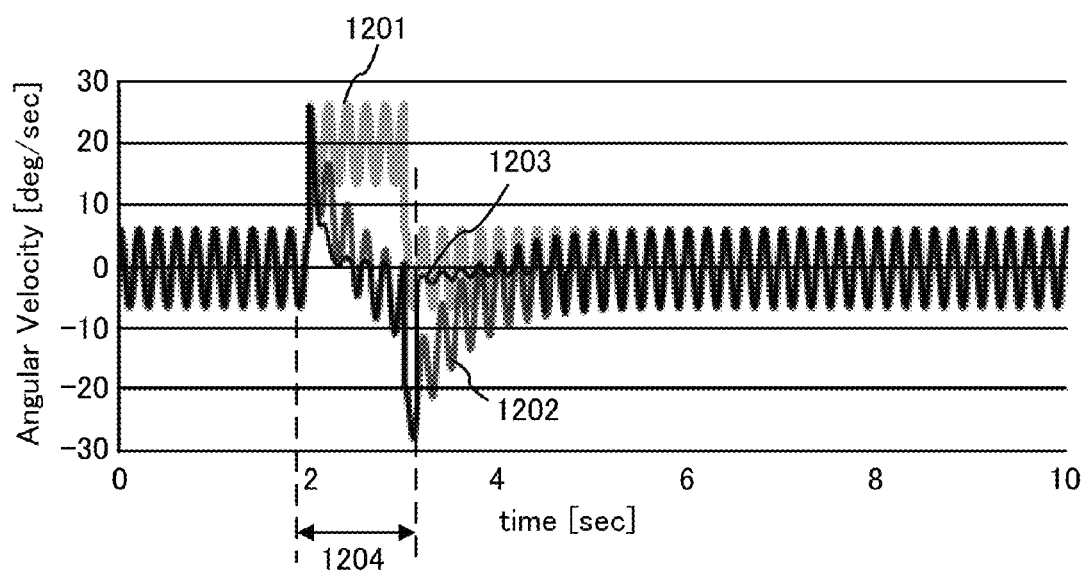
FIG. 12 is an explanatory diagram of an angular velocity waveform of the image pickup apparatus in Embodiment 2.

Next, referring to FIGS. 12 and 13, an effect of processing of limiting the movable range of the low-frequency removed vibration correction angle based on the absolute angle will be described. FIG. 12 is an explanatory diagram of an angular velocity waveform of the image pickup apparatus 101b. In FIG. 12, reference numeral 1201 denotes an angular velocity of the image pickup apparatus 101b. Reference numeral 1202 denotes a HPF-applied angular velocity as an output of the HPF 801. Reference numeral 1203 denotes a movable-range limited angular velocity as an output of the movable range limiting unit 810. In a time period 1204, the angle of the image pickup apparatus 101b greatly changes.

Figure 13:
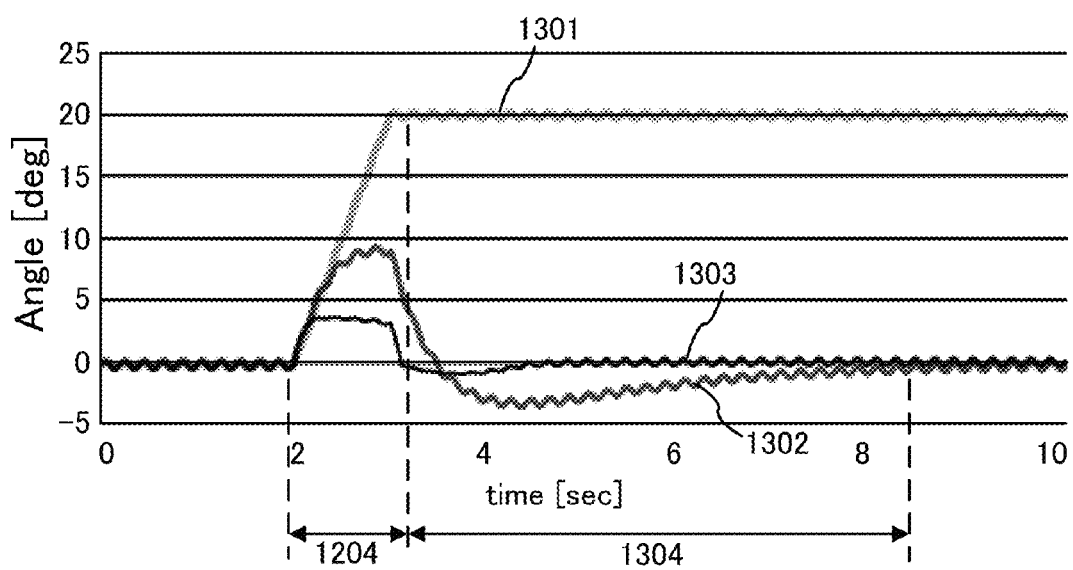
FIG. 13 is an explanatory diagram of an angle waveform of the image pickup apparatus in Embodiment 2.

FIG. 13 is an explanatory diagram of an angle waveform of the image pickup apparatus 101b. In FIG. 13, reference numeral 1301 denote an angle of the image pickup apparatus 101b. Reference numeral 1302 denotes a signal which is obtained by performing integration processing on the HPF-applied angular velocity 1202 itself as an output of the HPF 801. Reference numeral 1303 denotes a signal which is obtained by performing integration processing on the movable-range limited angular velocity 1203.

Due to the influence of the operation of changing the angle of the image pickup apparatus 101b during the time period 1204, the angle of the image pickup apparatus 101b greatly changes before and after the time period 1204. The correction angle as an output of the integrating unit 802 is a vibration correction control signal that corrects an angle of a relatively-high frequency component, and accordingly it is preferred that it is controlled as close to the center as possible. However, the signal 1302 obtained when the movable range is not limited is output as an angle with a sign of an opposite direction to the angle 1301 of the image pickup apparatus 101b during the time period 1304.This is caused by the HPF 801. When a large vibration occurs, a low frequency component with a large amplitude is also damped, and a signal in an opposite direction to an actual angle direction (swing-back) is generated due to the influence at the time of finishing the large angle change. Then, while this signal is converged to zero slowly, it is difficult to perform highly-accurate correction since a correction amount is calculated based on the signal in the opposite direction to the actual vibration of the image pickup apparatus 101b if the correction is performed based on this signal. As described above, if the vibration correction angle is calculated to have a direction with an opposite sign to that of the angle 1301 (absolute angle), instead of the vicinity of the center like the time period 1304, there is a possibility that the change of the angle during the time period 1304 appears in a synthesized angle when the signal 1302 (vibration correction angle) is synthesized with the tilt correction angle. In this case, the correction cannot be performed accurately, and on the contrary, the image blur occurs due to the swing-back.

When a large angle change occurs and the output of ±45-degree converting unit 803 is within a predetermined range, the movable range limiting unit 810 changes angle threshold values (angles A1, A2, B1, and B2). When a difference between the absolute angle and the low-frequency removed vibration correction angle is located at a positive side within the predetermined range, the angle threshold values (angles B1 and B2) are set to increase so that the low-frequency removed vibration correction angle is not easily changed to a negative side. On the other hand, when the difference between the absolute angle and the low-frequency removed vibration correction angle is located at the negative side within the predetermined range, the angle threshold values (angles A1 and B1) are set to decrease so that the low-frequency removed vibration correction angle is not easily changed to the positive side. Accordingly, the correction angle by the movable range limitation can be obtained at the vicinity of the center or in the same direction as that of the sign of the absolute angle like the signal 1303. Therefore, even when the absolute angle and the low-frequency removed vibration correction angle are synthesized and the tilt angle exceeds the movable range, the tilt correction and the vibration correction can be performed appropriately by performing the correction so that the tilt correction effect is achieved by the correction angle at the vicinity of the movable range.

In this embodiment, as an inputs signal to the movable range limiting unit 810 to change the angles A1, A2, B1, and B2 (threshold values), a signal obtained by subtracting the output of the integrating unit 802 (low-frequency removed vibration correction angle) from the output of the Kalman filter 503 (absolute angle) and then by performing the ±45-degree conversion is used. However, this embodiment is not limited to this and the signal from the Kalman filter 503 can be used as it is, or alternatively a signal obtained by cutting a high-frequency component from the signal from the Kalman filter 503 by using a LPF or the like may be used.

As described above, the image pickup apparatus 101*b* in this embodiment calculates the low-frequency removed vibration correction angle, which is obtained by limiting the movable range, based on the absolute angle, and it synthesizes the absolute angle with the low-frequency removed vibration correction angle to perform the tilt correction. Thus, even when the absolute angle exceeds the movable range, the tilt correction can be performed near the movable range to achieve a correction effect as much as possible while correcting a hand-shake component in a high frequency. Accordingly, the tilt correction and the vibration correction can be performed appropriately.

In the control block of the image pickup apparatus 101*b* illustrated in FIG. 8, the variable gain is set based on a signal obtained by subtracting the low-frequency removed vibration correction angle as an output of the integrating unit 802 from the absolute angle as an output from the Kalman filter 503. Then, the correction angle is calculated based on the absolute angle, the low-frequency removed vibration correction angle, and the variable gain. However, this embodiment is not limited to this, and instead, the variable gain may be set based on the absolute angle as an output from the Kalman filter 503 to calculate the correction angle.

Figure 14:
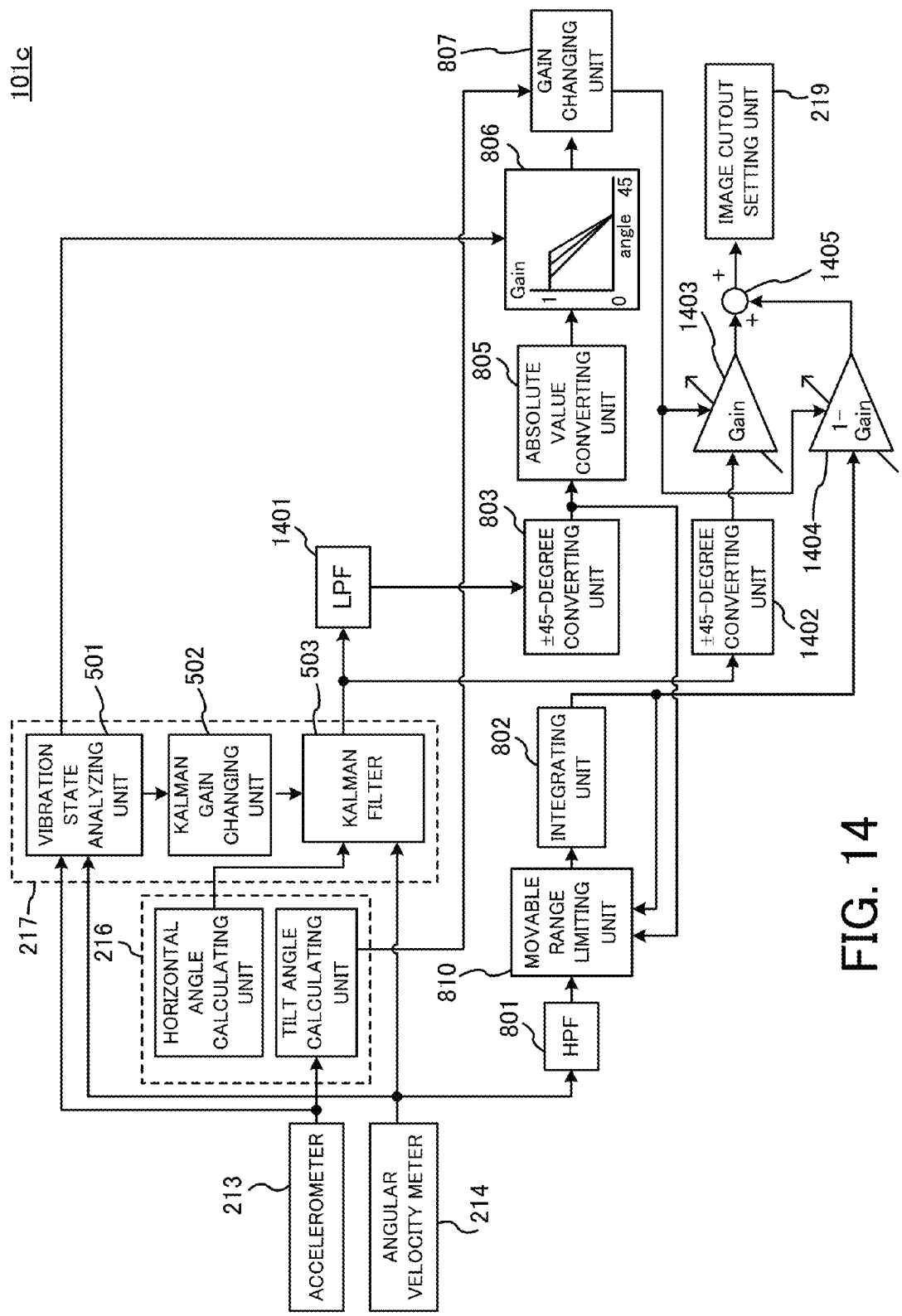
FIG. 14 is a block diagram of the image pickup apparatus in Embodiment 2.

Referring to FIG. 14, a method of setting a variable gain based on the absolute angle to calculate the correction angle based on the absolute angle, the low-frequency removed vibration correction angle, and the variable gain will be described. FIG. 14 is a block diagram of an image pickup apparatus 101*c* in this embodiment, and the same parts as those of the image pickup apparatus 101*b* described referring to FIG. 8 are denoted by the same reference numerals.

In the control block of FIG. 14, the variable gain is calculated from the absolute angle of the output from the Kalman filter 503, instead of being calculated from a difference value between the absolute angle as an output of the Kalman filter 503 and the low-frequency removed vibration correction angle as an output of the integrating unit 802. The absolute angle of the output from the Kalman filter 503 is input to a LPF 1401 to cut a high frequency component of the signal, and then it is input to the ±45-degree converting unit 803. Thus, similarly to the method performed by using the ±45-degree converting unit 803, the absolute converting unit 805, the gain table 806, and the gain changing unit 807 illustrated in FIG. 8, the variable gain is calculated.

The output of the Kalman filter 503 is input to a ±45-degree converting unit 1402 (±45-degreeconverter) as well, and similarly to the ±45-degree converter 803, it is converted to a signal between ±180 degrees and ±45 degrees. The output of the ±45-degree converting unit 1402 is input to a variable gain 1403 to multiply the output by the variable gain calculated by the gain changing unit 807. The low-frequency removed vibration correction angle as an output of the integrating unit 802 is input to a variable gain 1404, and it is multiplied by a value which is obtained by subtracting the variable gain calculated by the gain changing unit 807 from 1. The variable gain 1403 and the variable gain 1404 are input to an adding unit 1405 (adder), and it synthesizes the absolute angle with the low-frequency removed vibration correction angle based on a synthesis ratio set by the variable gains to calculate the correction angle. Then, the image cutout setting unit 219 performs the image cutout based on the correction angle to perform the tilt correction.

The image pickup apparatus 101*c* can calculate the correction angle similarly to the image pickup apparatus 101*b* described referring to FIG. 8, and it is possible to calculate the correction angle for the tilt correction within the limited movable range. Accordingly, even when the absolute angle of the image pickup apparatus 101*c* exceeds the movable range, the performance of the vibration correction control of the high frequency component is not damaged due to a hand shake. Furthermore, even when the absolute angle of the image pickup apparatus 101*c* exceeds the movable range, the tilt correction can be effectively performed at an angle close to the movable range.

As described above, in each embodiment, a control apparatus (controller 215) includes a first angle calculating unit (angle calculating unit 216), an analyzing unit (vibration state analyzing unit 501), a second angle calculating unit (horizontal angle calculating unit 217 or tilt angle calculating unit 218), and a correcting unit. The first angle calculating unit calculates a first angle (first horizontal angle or first tilt angle) based on an acceleration detected by an acceleration detector (accelerometer 213). The analyzing unit analyzes a vibration state based on at least one of the acceleration and an angular velocity detected by an angular velocity detector (angular velocity meter 214). The second angle calculating unit calculates a second angle (second horizontal angle or second tilt angle) based on the angular velocity, the first angle, and the vibration state. The correcting unit (image cutout setting unit 219, image processing unit 206, correction lens driver 701, or image pickup element rotating driver 702) performs tilt correction based on the second angle. At least one processor or circuit is configured to perform a function of at least one of the units.

Preferably, the second angle calculating unit changes a relative weight between the angular velocity and the first angle depending on the vibration state to calculate the second angle. More preferably, the second angle calculating unit increases a weight of the angular velocity (S611, S616, S623, S628) if the vibration state indicates that a vibration is larger than (or not less than) a predetermined amount. On the other hand, the second angle calculating unit increases a weight of the first angle (S611, S612, S623, S624) if the vibration state indicates that the vibration is smaller than the predetermined amount.

Preferably, the first angle calculating unit calculates a tilt angle (first tilt angle) as the first angle. Then, the second angle calculating unit calculates a horizontal angle (second horizontal angle) as the second angle based on the tilt angle. Preferably, the first angle calculating unit calculates a horizontal angle (first horizontal angle) as the first angle. Then, the second angle calculating unit calculates a tilt angle (second tilt angle) as the second angle based on the horizontal angle.

Preferably, the second angle calculating unit calculates the second angle by using a Kalman filter 503 capable of changing a Kalman gain. Preferably, the correcting unit includes a setting unit (image cutout setting unit 219) that sets a tilt correction amount (shift amount of an object image or rotation correction amount) of an image based on the second angle. More preferably, the correcting unit includes an image processing unit 206 that cuts out an image based on the tilt correction amount to perform the tilt correction. Preferably, the correcting unit includes a driver (correction lens driver 701 or image pickup element rotating driver 702) that drives, based on the second angle, at least one of an image pickup element (image pickup unit 204), a lens (shift lens unit 703), and a body including the lens and the image pickup element integrated with each other.

Preferably, the control apparatus includes a third angle calculating unit (HPF 801, movable range limiting unit 810, integrating unit 802) and a correction angle calculating unit (gain table 806, gain changing unit 807, variable gain 808, adding unit 809 or 1405). The third angle calculating unit removes a low frequency component from the angular velocity detected by the angular velocity detector to calculate a third angle. The correction angle calculating unit calculates a correction angle based on the second angle and the third angle. The correcting unit performs the tilt correction based on the correction angle. More preferably, the correction angle calculating unit includes a gain changing unit 807 that changes a gain based on a signal which is obtained by subtracting the third angle from the second angle or based on the second angle. Then, the correction angle calculating unit calculates the correction angle based on the second angle, the third angle, and the gain. More preferably, the gain changing unit changes the gain based on the first angle (first tilt angle or first horizontal angle). Preferably, the third angle calculating unit includes a limiting unit (movable range limiting unit 810) that limits a range of the third angle based on the second angle. Preferably, the control apparatus includes a setting unit (image cutout setting unit 219) that sets a tilt correction amount of an image based on the correction angle.

Preferably, the correction angle calculating unit includes a gain changing unit that changes a gain based on a tilt angle as the second angle, and it calculates a horizontal correction angle as the correction angle based on the tilt angle, the third angle, and the gain. Preferably, the correction angle calculating unit includes a gain changing unit that changes a gain based on a horizontal angle as the second angle, and it calculates a tilt correction angle as the correction angle based on the horizontal angle, the third angle, and the gain.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The image pickup apparatus in each embodiment is capable of calculating an absolute angle of the image pickup apparatus in a wide frequency band to perform tilt correction based on the obtained absolute angle even in a large vibration condition. Accordingly, the image pickup apparatus of each embodiment is capable of correcting a tilt with respect to a plane perpendicular to a gravity direction of an image pickup element over the wide frequency band with high accuracy in any vibration condition of the image pickup apparatus. Consequently, according to each embodiment, a control apparatus, an image pickup apparatus, a control method, and a non-transitory computer-readable storage medium which are capable of performing highly-accurate tilt correction even in a large vibration state can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, each embodiment can be applied also to an image pickup apparatus such as a surveillance camera, a Web camera, a cell-phone, in addition to the tilt correction apparatus provided in a digital single-lens reflex camera, a digital compact camera, or a video camera.

This application claims the benefit of Japanese Patent Application No. 2015-036324, filed on Feb. 26, 2015, which is hereby incorporated by reference herein in its entirety.

What is claimed is:

1. A control apparatus comprising:
   at least one processor executing computer executable instructions or at least one circuit which functions as:
      a first angle calculating unit that calculates a first angle based on an acceleration detected by an acceleration detector;
      an analyzing unit that analyzes a vibration state based on at least one of the acceleration and an angular velocity detected by an angular velocity detector;
      a second angle calculating unit that calculates a second angle based on the angular velocity, the first angle, and the vibration state, the second angle being an angle with respect to a direction that is perpendicular to a gravity direction; and
      a correcting unit that performs tilt correction of a horizontal component of an image pickup apparatus or tilt component of the image pickup apparatus based on the second angle.

2. The control apparatus according to claim 1, wherein the second angle calculating unit changes a relative weight between the angular velocity and the first angle depending on the vibration state to calculate the second angle.

3. The control apparatus according to claim 2, wherein the second angle calculating unit:
   increases a weight of the angular velocity if the vibration state indicates that a vibration is larger than a predetermined amount, and
   increases a weight of the first angle if the vibration state indicates that the vibration is smaller than the predetermined amount.

4. The control apparatus according to claim 1, wherein:
the first angle calculating unit calculates a tilt angle as the first angle, and
the second angle calculating unit calculates a horizontal angle as the second angle based on the tilt angle.
5. The control apparatus according to claim 1, wherein:
the first angle calculating unit calculates a horizontal angle as the first angle, and
the second angle calculating unit calculates a tilt angle as the second angle based on the horizontal angle.
6. The control apparatus according to claim 1, wherein the second angle calculating unit calculates the second angle by using a Kalman filter capable of changing a Kalman gain.
7. The control apparatus according to claim 1, wherein the correcting unit includes a setting unit that sets a tilt correction amount of an image based on the second angle.
8. The control apparatus according to claim 7, wherein the correcting unit includes an image processing unit that cuts out an image based on the tilt correction amount to perform the tilt correction.
9. The control apparatus according to claim 1, wherein the correcting unit includes a drive unit that drives, based on the second angle, at least one of an image pickup element, a lens, and a body including the lens and the image pickup element integrated with each other.
10. The control apparatus according to claim 1, wherein the at least one processor or the at least one circuit further functions as:
a third angle calculating unit that removes a low frequency component from the angular velocity detected by the angular velocity detector to calculate a third angle; and
a correction angle calculating unit that calculates a correction angle based on the second angle and the third angle,
wherein the correcting unit performs the tilt correction based on the correction angle.
11. The control apparatus according to claim 10,
wherein the correction angle calculating unit includes a gain changing unit that changes a gain based on a signal which is obtained by subtracting the third angle from the second angle, and
wherein the correction angle calculating unit calculates the correction angle based on the second angle, the third angle, and the gain.
12. The control apparatus according to claim 10,
wherein the correction angle calculating unit includes a gain changing unit that changes a gain based on the second angle, and
wherein the correction angle calculating unit calculates the correction angle based on the second angle, the third angle, and the gain.
13. The control apparatus according to claim 11, wherein the gain changing unit changes the gain based on the first angle.
14. The control apparatus according, to claim 10, wherein the third angle calculating unit includes a limiting unit that limits a range of the third angle based on the second angle.
15. The control apparatus according to claim 10, wherein the at least one processor or the at least one circuit further functions as a setting unit that sets a tilt correction amount of an image based on the correction angle.
16. The control apparatus according to claim 10,
wherein the correction angle calculating unit includes a gain changing unit that chances a gain based on a tilt angle as the second angle, and
wherein the correction angle calculating unit calculates a horizontal correction angle as the correction angle based on the tilt angle, the third angle, and the gain.
17. The control apparatus according to claim 10,
wherein the correction angle calculating unit includes a gain changing unit that changes a gain based on a horizontal angle as the second angle, and
wherein the correction angle calculating unit that calculates a tilt correction angle as the correction angle based on the horizontal angle, the third angle, and the gain.
18. An image pickup apparatus comprising:
an image pickup element configured to photoelectrically convert an optical image formed via an optical system to output an image signal;
an acceleration detector configured to detect an acceleration;
an angular velocity detector configured to detect an angular velocity; and
at least one processor which functions as:
a first angle calculating unit that calculates a first angle based on the acceleration;
an analyzing unit that analyzes a vibration state based on at least one of the acceleration and the angular velocity;
a second angle calculating unit that calculates a second angle based on the angular velocity, the first angle, and the vibration state, the second angle being an angle with respect to a direction that is perpendicular to a gravity direction; and
a correcting unit that performs tilt correction of a horizontal component of an image pickup apparatus or tilt correction of a tilt component of the image pickup apparatus based on the second angle.
19. A control method comprising the steps of:
calculating a first angle based on an acceleration detected by an acceleration detector;
analyzing a vibration state based on at least one of the acceleration and an angular velocity detected by an angular velocity detector;
calculating a second angle based on the angular velocity, the first angle, an the vibration state, the second angle being an angle with respective to a direction that is perpendicular to a gravity direction; and
performing tilt correction of a horizontal component of an image pickup apparatus or tilt correction of a tilt component of the image pickup apparatus based on the second angle.
20. A non-transitory computer-readable storage medium which stores a program causing a computer to execute a process comprising the steps of:
calculating a first angle based on an acceleration detected by an acceleration detector;
analyzing a vibration state based on at least one of the acceleration and an angular velocity detected by an angular velocity detector;
calculating a second angle based on the angular velocity, the first angle, and the vibration state, the second angle being an angle with respect to a direction that is perpendicular to a gravity direction; and
performing tilt correction of a horizontal component of an image pickup apparatus or tilt correction of a tilt component of the image pickup apparatus based on the second angle.
21. A control apparatus comprising:
at least one processor executing computer executable instructions or at least one circuit which functions as:

a first angle calculating unit that calculates a first angle based on information related to an acceleration detected by a first detector;
an analyzing unit that analyzes a vibration state based on at least one of the information related to the acceleration and information related to an angular velocity detected by a second detector;
a second angle calculating unit that calculates a second angle based on the information related to the angular velocity, the first angle, and the vibration state, the second angle being an angle with respect to a direction that is perpendicular to a gravity direction; and
a correcting unit that performs tilt correction of a horizontal component of an image pickup apparatus or tilt correction of a tilt component of the image pickup apparatus based on the second angle.

22. The control apparatus according to claim 21, wherein the second angle calculating unit changes a relative weight between the information related to the angular velocity and the first angle depending on the vibration state to calculate the second angle.

23. The control apparatus according to claim 22, wherein the second angle calculating unit:
increases a weight of the information related to angular velocity if the vibration state indicates that a vibration is larger than a predetermined amount, and
increases a weight of the first angle if the vibration state indicates that the vibration is smaller than the predetermined amount.

24. The control apparatus according to claim 21, wherein:
the first angle calculating unit calculates a tilt angle as the first angle, and
the second angle calculating unit calculate a horizontal angle as the second angle based on the tilt angle.

25. The control apparatus according to claim 21, whereon:
the first angle calculating unit calculates horizontal angle as the first angle, and
the second angle calculating unit calculates a tilt angle as the second angle based on the horizontal angle.

26. The control apparatus according to claim 21, wherein the second angle calculating unit calculates the second angle by using a Kalman filter capable of changing a Kalman gain.

27. The control apparatus according to claim 21, wherein the correcting unit includes a setting unit that sets a tilt correction amount of an image based on the second angle.

28. The control apparatus according to claim 27, wherein the correcting unit includes an image processing unit that cuts out an image based on the tilt correction amount to perform the tilt correction.

29. The control apparatus according to claim 21, wherein the correcting unit includes a drive unit that drives, based on the second angle, at least one of an image pickup element, a lens, and a body including the lens and the image pickup element integrated with each other.

30. The control apparatus according to claim 21, wherein the at least one processor or the at least one circuit further functions as:
a third angle calculating unit that removes a low frequency component from the information related to the angular velocity detected by the second detector to calculate a third angle; and
a correction angle calculating unit that calculates a correction angle based on the second angle and the third angle
wherein the correcting unit performs the tilt correction based on the correction angle.

31. The control apparatus according to claim 30,
wherein the correction angle calculating unit includes a gain changing unit that change gain based on a signal which is obtained by subtracting the third angle from the second angle, and
wherein the correction angle calculating unit calculates the correction angle based on the second angle, the third angle, and the gain.

32. The control apparatus according to claim 30,
wherein the correction angle calculating unit includes a gain changing unit that changes a gain based on the second angle, and
wherein the correction angle calculating unit calculates the correction angle based on the second angle, the third angle, and the gain.

33. The control apparatus according to claim 31, wherein the gain changing unit changes the gain based on the first angle.

34. The control apparatus according to claim 30, wherein the third angle calculating unit includes a limiting unit that limits a range of the third angle based on the second angle.

35. The control apparatus according to claim 30, wherein the at least one processor or the at least one circuit further functions as a setting unit that sets a tilt correction amount of an image based on the correction angle.

36. The control apparatus according to claim 30,
wherein the correction angle calculating unit includes a gain changing unit that chances a gain based on a tilt angle as the second angle, and
wherein the correction angle calculating unit calculates a horizontal correction angle as the correction angle based on the tilt angle, the third angle, and the gain.

37. The control apparatus according to claim 30,
wherein the correction angle calculating unit includes a gain changing unit that changes a gain based on a horizontal angle as the second angle, and
wherein the correction angle calculating unit that calculates a tilt correction angle as the correction angle based on the horizontal angle, the third angle, and the gain.

38. An image pickup apparatus comprising:
an image pickup element configured to photoelectrically convert an optical image formed via an optical system to output an image signal;
a first detector configured to detect information related to an acceleration;
a second detector configured to detect information related to an angular velocity; and
at least one processor which functions as:
a first angle calculating unit that calculates a first angle based on the information related to acceleration;
an analyzing unit that analyzes a vibration state based on at least one of the information related to the acceleration and the information related to the angular velocity;
a second angle calculating unit that calculates a second angle based on the information related to the angular velocity, the first angle, and the vibration state, the second angle being an angle with respect to a direction that is perpendicular to a gravity direction; and
a correcting unit that performs tilt correction of a horizontal component of an image pickup apparatus or tilt correction of a tilt component of the image pickup apparatus based on the second angle.

39. A control method comprising the steps of,
calculating a first angle based on information related to an acceleration detected by a first detector;

analyzing a vibration state based on at least one of the information related to the acceleration and information related to an angular velocity detected by a second detector;
calculating a second angle based on the information related to the angular velocity, the first angle, and the vibration state, the second angle being an angle with respect to a direction that is perpendicular to a gravity direction; and
performing tilt correction of a horizontal component of an image pickup apparatus or tilt correction of a tilt component of the image pickup apparatus based on the second angle.

40. A non-transitory computer-readable storage medium which stores a program causing a computer to execute a process comprising the steps of:
calculating a first angle based on information related to an acceleration detected by a first detector;
analyzing a vibration state based on at least one of the information related to the acceleration and information related to an angular velocity detected by a second detector;
calculating a second angle based on the information related to the angular velocity, the first angle, and the vibration state, the second angle being an angle with respect to a direction that is perpendicular to a gravity direction; and
performing tilt correction of a horizontal component of an image pickup apparatus or tilt correction of a tilt component of the image pickup apparatus based on the second angle.

41. A control apparatus comprising:
at least one processor executing computer executable instructions or at least one circuit which functions as:
a first angle calculating unit that calculates a first angle based on information related to an acceleration detected by a first detector;
an analyzing unit that analyzes a vibration state based on at least one of the information related to the acceleration and information related to an angular velocity detected by a second detector:
a second angle calculating unit that calculates a second angle based on the information elated to the angular velocity, the first angle, and the vibration state, the second angle being an angle with respect to a direction that is perpendicular to a gravity direction; and
a correcting unit that performs tilt correction of a horizontal component of an image pickup apparatus or tilt correction of a tilt component of the image pickup apparatus based o the second angle,
wherein the second angle calculating unit:
increases a weight of the information related to the angular velocity in a case where the vibration state indicates that a vibration is larger than or equal to a predetermined amount compared with a case where the vibration is smaller than the predetermined amount, and
decreases a weight of the first angle in a case where the vibration state indicates that the vibration is larger than or equal to the predetermined amount compared with a case where the vibration is smaller than the predetermined amount.

42. An image pickup apparatus comprising:
an image pickup element configured to photoelectrically convert an optical image formed via n optical system to output an image signal;
a first detector configured to detect information related to an acceleration;
a second detector configured to detect information related to an, angular velocity; and
at least one processor which functions as:
a first angle calculating unit that calculates first angle based on the information related to acceleration;
an analyzing unit that analyzes a vibration state based on at least one of the information related to the acceleration and the information related to the angular velocity;
a second angle calculating unit that calculates a second angle based on the information related to the angular velocity, the first angle, and the vibration state, the second angle being an angle with respect to a direction that is perpendicular to gravity direction; and
a correcting unit that performs tilt correction of a horizontal component of an image pickup apparatus or tilt correction of a tilt component of the image pickup apparatus based on the second angle,
wherein the second angle calculating unit:
increases a weight of the information related to the angular velocity in a case where vibration state indicates that a vibration is larger than or equal to a predetermined amount compared with a case where the vibration is smaller than the predetermined amount, and
decreases a weight of the first angle in a case where the vibration state indicates that the vibration is larger than or equal to the predetermined amount compared with a case where the vibration is smaller than the predetermined amount.

43. A control method comprising the steps of:
calculating a first angle based on information related to an acceleration detected by a first detector;
analyzing a vibration state based n at least one of the information related to the acceleration and information related to an angular velocity detected by a second detector;
calculating a second angle based on the information related to the angular velocity, the first angle, and the vibration state, the second angle being an angle with respect to a direction that is perpendicular to a gravity direction, and
performing tilt correction of a horizontal component of an mage pickup apparatus or correction of a tilt component of the image pickup apparatus based on the second angle,
wherein the step of calculating the second angle:
increases a weight of the information related to the angular velocity in a case where the vibration state indicates that a vibration is larger than or equal to a predetermined amount compared with a case where the vibration is smaller than the predetermined amount, and
decreases a weight of the first angle in a case where the vibration state indicates that the vibration is larger than or equal to the predetermined amount compared with a case where the vibration is smaller than the predetermined amount.

44. A non-transitory computer-readable storage medium which stores a program causing a computer to execute a process comprising the steps of:
calculating a first ng based on information related to an acceleration detected by a first detector;

analyzing a vibration state based on at least one of the information related to the acceleration and information related to an angular velocity detected by a second detector;

calculating a second angle based on the information related to the angular velocity, the first angle, and the vibration state, the second angle being an angle with respect to a direction that is perpendicular to a gravity direction; and performing tilt correction of a horizontal component of an image pickup apparatus or tilt correction of a tilt component of the image pickup apparatus based on the second angle, wherein the step of calculating the second angle:

increases a weight of the information related to the angular velocity in a case where the vibration state indicates that a vibration is larger than or equal to a predetermined amount compared with a case where the vibration is smaller than the predetermined amount, and decreases a weight of the first angle in a case where the vibration state indicates that the vibration is larger than or equal to the predetermined amount compared with a case where the vibration smaller than the predetermined amount.

* * * * *